United States Patent [19]
Vicik et al.

[11] Patent Number: 5,460,861
[45] Date of Patent: Oct. 24, 1995

[54] MULTILAYER STRETCH/SHRINK FILM

[75] Inventors: Stephen J. Vicik, Darien; Craig L. Sandford, Wheeling, both of Ill.

[73] Assignee: Viskase Corporation, Chicago, Ill.

[21] Appl. No.: 241,315

[22] Filed: May 10, 1994

[51] Int. Cl.⁶ .......................... B65B 53/00; B32B 27/08; B65D 85/00; B29C 47/00
[52] U.S. Cl. .......................... 428/34.9; 428/516; 428/910; 428/349; 428/520; 426/127; 426/129; 156/244.22; 156/244.24; 156/244.27; 156/327; 156/334; 156/306.6
[58] Field of Search .................... 428/34.9, 516, 428/910, 349, 520; 426/127, 129; 156/244.22, 244.24, 244.27, 306.6, 327, 334

[56] References Cited

U.S. PATENT DOCUMENTS

| | | |
|---|---|---|
| 4,640,856 | 2/1987 | Ferguson et al. . |
| 4,863,769 | 9/1989 | Lustig et al. . |
| 5,183,867 | 2/1993 | Welborn, Jr. . |
| 5,272,016 | 12/1993 | Ralph . |
| 5,279,872 | 1/1994 | Ralph . |

FOREIGN PATENT DOCUMENTS

0416815A2  3/1991  European Pat. Off. .

OTHER PUBLICATIONS

Proceedings of Future-Pak '91—Ninth International Ryder Conference on Food Packaging Innovations—Presented on Oct. 2–4, 1991, Ryder Associates, Inc. Whippany, N.J.
Mutsui Petrochemical Industries, Ltd., Resin Modifiers TAFMER.

*Primary Examiner*—P. C. Sluby
*Attorney, Agent, or Firm*—Donna Bobrowicz

[57] ABSTRACT

This invention relates to an improved biaxially oriented heat shrinkable multilayer film, a hermetically sealed and evacuated trayed food package wherein the film is used as a stretched heat shrunk overwrap and a method for sealing and wrapping such packages.

24 Claims, 2 Drawing Sheets

MULTILAYER STRETCH/SHRINK FILM

FIELD OF THE INVENTION

This invention relates to an improved biaxially oriented heat shrinkable multilayer film, a hermetically sealed and evacuated trayed food package wherein the film is used as a stretched heat shrunk overwrap and a method for sealing and wrapping such packages.

BACKGROUND OF THE INVENTION

For many years, food products such as fresh poultry were shipped in bulk from the food processors to supermarkets where the bulk pieces were divided into small quantities and repackaged for retailing. For example, fresh poultry was cut up, placed on cardboard or plastic trays, and covered with stretch film secured to the tray by tack welding.

For improved efficiency the current trend is to perform the retail packaging operation in the food processing plant and ship the small retail packages from such plants to the retailers. There is also a trend towards evacuating and hermetically sealing the food retail packages in the central food processing plants, due to the longer storage time between retail packaging and consumer use. Such packaging increases the shelf life of the food packages. Also, there is a need for increased abuse resistant food retail packages because of the more frequent handling, impact and abrasion inherent in the above-described food processing plant retail packaging system.

This retail packaging can be accomplished in a variety of ways. A number of systems are available to food processors for wrapping and heat sealing poultry-containing trays with plastic overwrap film. One packaging system that uses a continuous belt sealer is the Ossid™ 500, produced by the Ossid Corporation. (Ossid™ is a trademark of the Ossid Corporation, North Carolina, USA.) Generally, a poultry-containing tray is moved by a series of conveyors and rolls while a film is fed from a dispenser and mechanically pulled over the tray top. The film edges are wrapped around the tray, pressed against the tray bottom, overlapped and sealed against it. Finally, the tray is moved forward and the opposite ends cut. In the Ossid™ 500 system both cut portions of the film, the flaps, are pulled under the tray and shaped under the tray.

Sealing is done with heat and pressure. In impulse sealing systems, the contact temperature ranges from about 400° to 800° F. with a high applied pressure due to the narrow sealing surface. In a bar heating sealing system, the temperature ranges from 250° to 400° F. with a similar pressure as above. The heat contact time is longer than with the impulse system. The Ossid 500 employs a continuous belt sealer that consists of a release belt that is drawn over a heated platen. The resultant platen seal has characteristics that vary significantly from other commercial sealing processes. In the platen heating-sealing system, the temperature is at about 250° to 400° F., using a low pressure of about 0.1 to 2.0 psi, with the heat contact time being 2 to 4 seconds.

The wrapped tray is passed to the belt or platen which applies heat that bonds the film layers together and, upon cooling, the seal is fixed. The heat bonded film is then immediately cooled to a temperature below about 200° F.

The machinability of the film, or the way that it operates on the machine, is an important characteristic of the film used.

The most commonly used film in the trayed food overwrap market is polyvinyl chloride (PVC). This thermoplastic polymer has been used because of satisfactory elongation and elastic memory. But in some instances the package becomes leaky during shipment and thereby unacceptable to the customer. This is because the PVC material in overwrapped trays is tack welded to itself and not hermetically sealed. This problem cannot be solved by hermetically sealing because of a very narrow sealing temperature range between which the seal is effective at the low temperature end and "burn through" or melting of the PVC at the high temperature end. This range is so limited as to be impractical with many commercially employed heat sealing systems.

Another limitation of PVC tray overwrap material is its poor resistance to physical abuse. The PVC material tends to tear along the edges of the overwrapped tray if rubbed during transit by another tray or an enclosing carton.

One characteristic of PVC is that although it contracts, it is not generally "heat-shrinkable", i.e., it is a material that tends not to return to its original unstretched (unextended) dimension when heated to its softening point. The terms "orientation" or "oriented" are used to describe the manufacture of heat-shrinkable films, wherein resin material is heated to its flow or melting point and extruded through a die into either tubular or sheet form. After cooling, the relatively thick extrudate is reheated to a temperature range suitable to orient or align the crystallites and/or molecules of the material. The orientation temperature range for a given material or materials is understood by those skilled in the art to be in a range which revises the intermolecular configuration of the material by physical alignment of the crystallites and/or molecules of the material to improve certain mechanical properties of the film such as shrink tension as, for example, measured in accordance with ASTM D-2838-81. When the stretching force is applied in one direction, uniaxial orientation results. When the stretching force is simultaneously applied in two directions, biaxial orientation results.

In view of the limitations of PVC as a stretch film food tray overwrap material, there have been prior efforts to identify a heat-shrinkable thermoplastic film having an improved combination of elongation, elastic memory, heat sealability and puncture resistance. However, most heat-shrinkable thermoplastic film packaging materials suitable for food contact have relatively poor elasticity or elastic memory. Thus, when a food wrapped in such a material shrinks from moisture loss, the film does not shrink, resulting in a loose package that is unacceptable.

One PVC replacement film for use as a trayed food overwrap material is described in U.S. Pat. Nos. 5,272,016 and 5,279,872, issued to D. J. Ralph ("Ralph"), incorporated herein by reference to the extent pertinent. The Ralph film is the biaxially oriented heat-shrinkable multilayer stretch type, comprising at least a first outer layer, a second outer layer, and a core layer between the first and second outer layers. The outer layers each comprise a blend of between about 20 and about 35 wt. % ("wt. %") ethylene α-olefin plastomer copolymer of density below about 0.90 g/cm$^3$, and between about 65 and about 80 wt. % very low density polyethylene ("VLDPE"). The core layer comprises ethylene α-olefin copolymer having a higher melting point than the melting point(s) of either of the first or second outer layers. By way of example, the core layer may be polypropylene or a polyolefin. Embodiments of the latter include VLDPE, linear low density polyethylene ("LLDPE"), and blends of two different density VLDPE's or VLDPE and LLDPE.

The Ralph-type film in nonirradiated form has been demonstrated to be suitable as a PVC replacement for food tray overwrapping and sealing by the impulse and bar heating-sealing systems. However, it has substantial limitations when used in platen sealing systems.

When the heat seal between the film layers forming the end flaps is not complete, the package is defective. Incomplete seals represent potential air/fluid leaks and loss of food quality and/or desired appearance in the retail market. As seen from the above, the number of overlapping film layers to be sealed together may vary substantially, generally from six to at least twenty. This means that the required maximum seal temperature must be relatively high, because as the number of film layers increases, the temperature at a given residence time required for a complete seal increases. However, "burn through" places an upper limit on the sealing temperature. Burn through means the temperature at which any hole or penetration of the film occurs, resulting from melting and/or shrinking of the film during sealing.

When the Ralph-type film with a 100% VLDPE core layer was tested for use on platen sealed poultry-containing trays, the sealing range was too narrow as complete sealing could not be obtained without burn through. In an attempt to overcome this problem, LLDPE was added to the core layer making the core a VLDPE-LLDPE blend. This formulation provided a broad enough platen seal range on an Ossid 500 system under ideal conditions, but under production conditions the sealing range was still too narrow. To broaden the heat sealing range of the VLDPE-LLDPE blend core layer Ralph-type film, the film was irradiated at a dose of 8 MR after biaxial orientation.

Although irradiation of the VLDPE-LLDPE blend core layer Ralph-type film provided the needed wide heat sealing range, a new and unexpected problem developed. The film had poor machinability. The slide characteristics of the film were such that the film could not be smoothly transported through and over the various belts and rollers which are essential to film movement through the wrapping machine. At the same time, it should be recognized that the film cannot be so frictionless that it cannot be secured by the clamps as, for example, chain grips, which grab the film edges and pull it taut over the top of the tray.

During testing, another facet of the machinability problem with the irradiated Ralph-type film, flap pull back, was discovered. Flap pull back refers to the tendency for the folded under flap to be pulled away from the tray bottom surface by movement across the rollers prior to entering the platen sealer-cooler. This problem appears to be related to the frictional properties of the film, possibly the ratio of the friction between the flap folding rollers on the platen sealing-cooling system and the film-to-film slip.

An improved polyolefin-type heat-shrinkable oriented stretch film suitable for use as a platen heat sealed overwrap material for a food tray with a wide sealing range and good machinability is needed. This film should also be characterized by good elongation, good elastic memory, puncture resistance and abrasion resistance.

An improved method for wrapping and platen-sealing a polyolefin stretch-shrink film as an overwrap on a food-containing tray is also needed.

Also needed is an improved evacuated hermetically sealed food-containing tray overwrapped by a heat shrunk polyolefin film.

BRIEF DESCRIPTION OF THE INVENTION

An improved polyolefin-type heat shrinkable oriented stretch film suitable for use as a overwrap material for a food tray that is platen heat sealed on an automated system has been invented. This film is characterized by good elongation, good elastic memory, puncture resistance and abrasion resistance. It also has a wide sealing range and good machinability, especially in the platen-type heat sealing system.

One aspect of this invention relates to a crosslinked biaxially oriented heat shrinkable multilayer stretch film comprising at least one outer layer, a second outer layer and a core layer between the first and second outer layers. The outer layers each comprise a two component polyethylene blend of between about 25 and about 75 wt. % VLDPE of density between about 0.900 and about 0.914 g/cm$^3$, and between about 25 and about 75 wt. % LLDPE of melt index below about 3.5 g/10 minutes and density between about 0.917 and about 0.925 g/cm$^3$. The LLDPE comprises less than about 35 wt. % of the total film weight.

The core layer of this film comprises a three component blend of between about 40 and about 75 wt. % first VLDPE having a density between about 0.905 and about 0.914 g/cm$^3$, between about 10 and about 35 wt. % second VLDPE of density between about 0.900 and about 0.905 g/cm$^3$, and between about 15 and about 35 wt. % ethylene α-olefin plastomer copolymer with a density below about 0.900 g/cm$^3$. In this film, the core layer has a lower composite melting point than do the outer layers.

The film of this invention has biaxial heat shrink properties and is crosslinked such that when subjected to the Platen Test (described below) on a plate heated to a contact surface temperature range between about 280° F. and about 400° F., for a contact time of between about 2 and about 4 seconds, the film heat seals and does not burn through. Heat shrinkable means that the film has at least 10% free shrink at 90° C. measured in both the machine and transverse directions in accordance with ASTM D-2732.

Another aspect of the invention relates to a hermetically sealed and evacuated food package comprising a tray with a bottom section surrounded by upwardly extending side and end walls, perishable food supported on the upper surface of the bottom section, and a stretched heat shrunk film extended over the food, the upper edges of the side walls and at least part of the lower surface of the tray bottom section and heat sealed to itself in flattened relationship against the lower surface so as to form with the tray a hermetically sealed enclosure for the food. In this aspect of the invention, the improvement is the biaxially oriented multilayer composition as the stretched heat shrunk film described in the paragraphs above.

Still another aspect of this invention relates to a process for platen heat sealing the overlying folded ends of multiple contiguous layers of a stretched thermoplastic film covering a food-containing tray having side and end walls upwardly extending from a bottom section wherein the multiple layers of film are folded over the tray end walls, pressed against the lower surface of the tray bottom section and interlayer heat bonded together to form a hermetically sealed and evacuated food package. The improvement comprises using as the thermoplastic film the above described at least three layer film article, providing a flat metal plate with a release surface as the platen surface, heating the upper surface of said plate to temperature between about 250° and 400° F., contacting pressed folded end portions of the stretched film cover with the heated metal plate for a period of between about 2 and about 4 seconds so as to bond the contiguous film layers of said folded end portions together without burn through of said film, and thereafter immediately cooling the beam bonded end portions of said film to temperature below about 200° F.

DETAILED DESCRIPTION OF THE INVENTION

Figure 1:
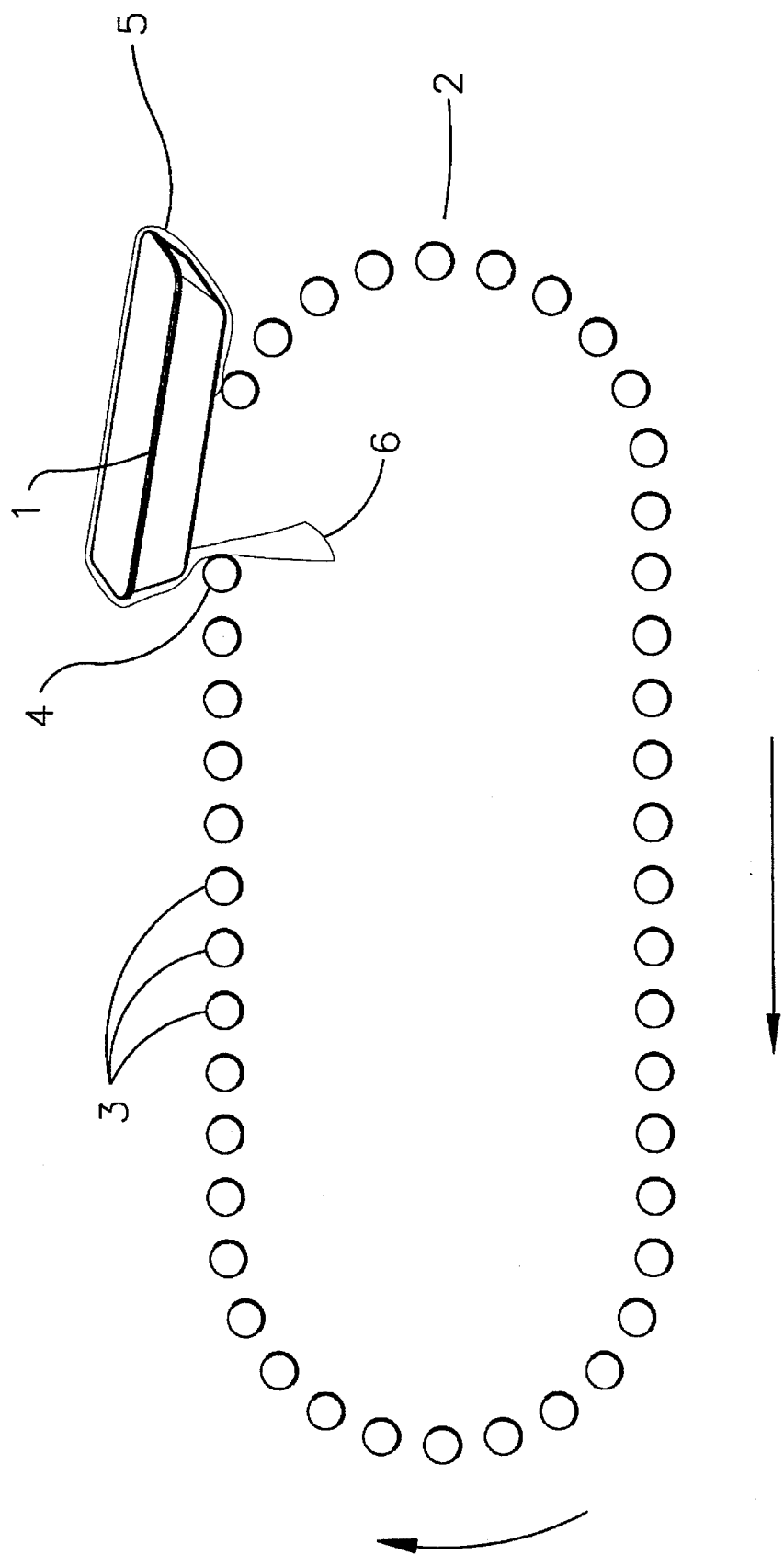
FIG. 1 is a cross-sectional view of the flap folding mechanism.

In the food industry and, in particular in the poultry industry, small quantities of poultry are cut up and packaged in trays which are overwrapped with film. This packaging allows retail sized quantities of food to be prepackaged by the food plant and shipped to retail outlets in a condition acceptable to both the health department authorities, the retailer and the final consumer.

The various film-shaping steps in a representative method for covering a food-containing open tray with a stretch-shrink film using the hot platen sealing system is described below. Each of the following steps is performed automatically on an overwrap system, in particular, the Ossid™ 500, starting with a tray of food or, particularly, poultry.

Food containing open trays are longitudinally spaced and moved forward on a feed conveyor belt. The feed belt is supported at opposite ends by rolls and moves continuously to carry trays to a position beneath a film roll dispersing system positioned above the conveyor belt. When a sensor detects the presence of the food containing tray beneath the feed roll system, film is then dispensed from the supply roll through a series of guide and tensioning rolls as will be understood by those skilled in the art. The dispensed and tensioned film is seized and stretched by a series of clamps as, for example, chain grips longitudinally aligned on opposite sides of the dispensed film edges at progressively increasing distances from the longitudinal centerline of the system in the direction of the film movement. Downwardly moving clamps grab the films outer edges and progressively pull the film tautly over the top edges of tray sides. There are two points in the chain gripping system where problems can occur with the wrong type of film: the film can be either too slippery for the clamps to correctly grasp it, or not slippery enough so that the film does not dispense easily and therefore jams up in the dispensing system.

The clamps are activated by cams at each end of chain grip belt to grab and release the tensioned film at respective opposite ends of the belt. Upon release from the grip clamps, the film is pulled under the tray by plates and center rollers. The two edges of the film are overlapped and can be longitudinally sealed together by heated rollers. The tubular film-enclosed tray is driven forward by belt conveyor having flexible, eg., elastomeric contact surfaces including side walls. The transverse distance of these side walls from the longitudinal centerline can be adjusted depending on the tray size and film thickness.

After the tube film longitudinal center seal is completed, the opposite ends are cut by knives. Next, the cut portion of the tube film extending in front of the tray (ie., the front flap) is pulled under the tray by a roller-vacuum system. Flap guides are located on each side of the tray to help shape the front flap so that it does not extend beyond the bottom edges of the tray. At this point in the film packaging system, the front end film has been stretched over and under the tray front end against the tray bottom and towards the tray rear end. The flap folding areas of the machine are also areas where film with incorrect frictional properties will jam up the overwrap process.

As shown in FIG. 1, the partially film 5 enclosed food-containing tray 1 then passes over the rear films flap folding conveyor 2 which, for example, may comprise a series of plastic rollers 3 with a leading metal roller 4. The latter is longitudinally spaced from the next forward roller to provide a gap. The trailing flap 6 is pulled with this gap by a mechanically applied vacuum system. The rollers 3, which are moving faster than the tray 1, flatten the trailing flap 6 under the tray 1 to form the food package.

As the rear flap is being folded under, the front flap can be pulled out. If frictional forces are higher between the film and the metal roller of the flap folding area than between the film and itself, the front flap is pulled out. If the front flap is not completely sealed, the whole package must be reworked.

The stretch wrapped food package is now moved to the sealer system.

Figure 2:
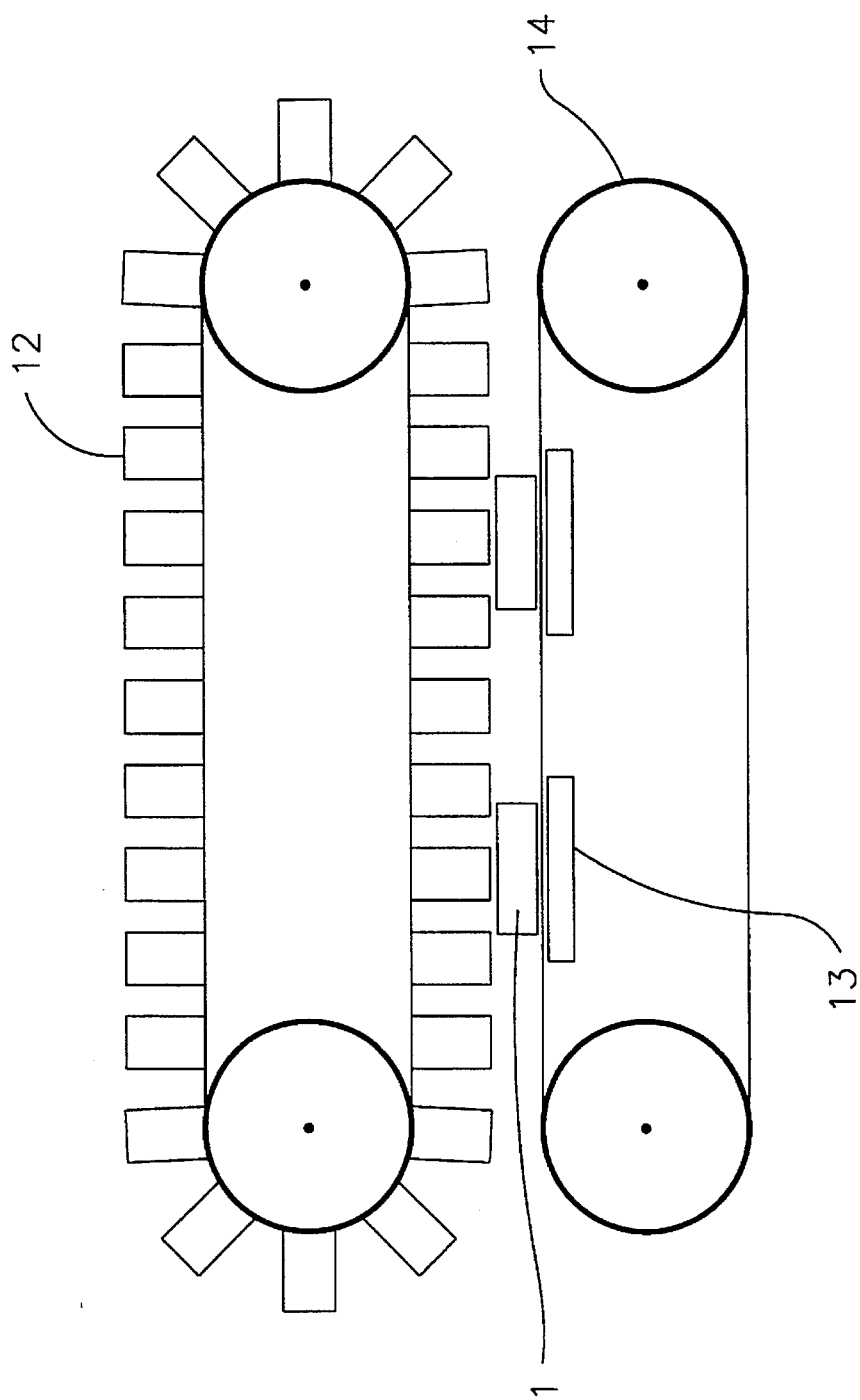
FIG. 2 is a cross-sectional elevation view of a sealer-cooler system.

As seen in FIG. 2, the bottom surfaces of foam pillows 12 in the sealer system are in direct contact with the wrapped food package 1 to apply uniform pressure to insure efficient heat transfer by solid conduction from the heated metal platen 13 to the film end folds pressed against the bottom outer surface of the tray 1. Heat is applied by a heating means, eg., electric resistance or circulating fluid. A representative temperature range for the heated platen top surface in the practice of this invention is 300°–400° F. Based on a belt sealer conveyor 14 speed of about 50 ft/minute and a 40" long heating platen 13, the tray-platen contact time is about 2–4 seconds.

After heat sealing the flap ends to themselves as supported by the food package bottom surface, the food package is conveyed to a cooling platen 15 that is cooled. The top surface of the platen may be cooled to about 55°–65° F. and is in contact with the tray 1 for a sufficient amount of time to cool the heated film below 200° F.

If the film used to overwrap the food trays has the wrong machinability qualities, the trays will not be usable. The film must be slippery enough to slide though the overwrap machine without jamming, but must be able to be held tautly in place when being stretched over the food and maintain this tautness until sealed. It must allow the trays to continue their forward movement on the conveyor belt once the flaps have been folded under. And finally, it must be able to be completely heat sealed without burning through the layers of film.

The polyolefin multilayer film of this invention requires at least three layers, two outer layers and a core layer between the outer layers, has biaxial heat shrink properties and is crosslinked. Stretch recovery and abrasion resistance of the film meets the requirements of the food packaging industry. It exhibits good machinability, overcomes the problems associated with an irradiated Ralph film, has adequate slip properties, is resistant to burn through and has no flap pull back.

The film of this invention is a crosslinked biaxially oriented heat shrinkable multilayer stretch film comprising at least one outer layer, a second outer layer and a core layer between the first and second outer layers. The outer layers each comprise a two component polyethylene blend of between about 25 and about 75 wt. % VLDPE of density between about 0.900 and about 0.914 g/cm$^3$, and between about 25 and about 75 wt. % LLDPE of melt index below about 3.5 g/10 minutes and density between about 0.917 and about 0.925 g/cm$^3$. The LLDPE comprises less than about 35 wt. % of the total film weight. A preferable range of components is from about 30 to about 40 wt. % of VLDPE and from about 60 to about 70 wt. % of LLDPE. Additives can comprise up to approximately 10% of the final formulation.

The core layer of this film comprises a three component blend of between about 40 and about 75 wt. % first VLDPE having a density between about 0.905 and about 0.914 g/cm$^3$, between about 10 and about 35 wt. % second VLDPE of density between about 0.900 and about 0.905 g/cm$^3$, and between about 15 and about 35 wt. % ethylene α-olefin plastomer copolymer with a density below about 0.900 g/cm$^3$. A preferable range of components is from about 60 to about 75 wt. % of the first VLDPE, about 13 to about 20 wt. % of the second VLDPE and about 15 to about 25 wt. % of the plastomer. Also, the ratio of plastomer to second VLDPE should range from about 0.77 to about 1.83, preferably from about 1.29 to about 1.42. Additives can comprise up to about 3% of the final formulation of the blend.

Polyolefins are hydrocarbon polymers derived from a simple olefin, such as polyethylene or polypropylene and copolymers of such olefins. Their basic structure is characterized by the chain $\{CH_2CH_2\}_n$ and they may be found as a homopolymer or as a copolymer. Polyolefins used in the present invention, unless otherwise noted, are substantially free of halogens, oxygen or other elements apart from carbon and hydrogen, except for incidental amounts, e.g., trace residues of catalysts or process related contaminants of the above.

The outer layers are a two component polyethylene blend of VLDPE and LLDPE, while the core layer is a three component blend of two VLDPE's and a so-called ethylene α-olefin "plastomer".

One type of polyethylene is known as Linear Low Density Polyethylene ("LLDPE"). Only copolymers of ethylene with α-olefins are in this group. LLDPEs are presently recognized by those skilled in the art as having densities from about 0.917 to about 0.940 g/cm$^3$. The α-olefin used is usually 1-butene, 1-hexene or 1-octene. Ziegler-type catalysts are usually employed in their production, although Phillips catalysts are also used to produce LLDPE having densities at the higher end of the range. LLDPEs typically do not have many long branches off the main chain.

Another form of linear polyethylene is Very Low Density Polyethylene ("VLDPE"), also called Ultra Low Density Polyethylene ("ULDPE"). The densities of commercial VLDPEs are recognized by those skilled in the art to range between about 0.890 and about 0.914 g/cm$^3$. VLDPEs comprise copolymers of ethylene with α-olefins, usually 1-butene, 1-hexene or 1-octene, and in some instances terpolymers, as, for example, of ethylene, 1-butene and 1-octene. As used here, VLDPE also includes terpolymers of ethylene and higher α-olefin comonomers.

A process for making VLDPE is described in European Patent Document publication number 120,503, hereby incorporated by reference. As described in EP 120,503, these particular VLDPEs are made by using the traditional Ziegler-Natta heterogeneous catalyst system.

Alternatively, VLDPE and LLDPE may be prepared by a homogeneous metallocene single-site catalyst system which in general produces molecular chains of more uniform lengths with more evenly spaced comonomer. This type of system is described in U.S. Pat. No. 5,183,867, assigned to Exxon Chemical Company ("Exxon") and European Patent Application Publication 0 416 815 A2, assigned to Dow Chemical Company ("Dow"), both incorporated by reference to the extent pertinent.

For example, as described in U.S. Pat. Nos. 4,640,856 and 4,863,769, VLDPEs are useful in biaxially oriented films which have superior properties to comparable films using LLDPEs. These superior properties include higher shrink, higher tensile strength and greater puncture resistance.

Commercially available ethylene α-olefin plastomers have densities typically below 0.900 g/cm$^3$. Examples of plastomers include the Japanese Mitsui Corporation's ("Mitsui") "Tafmers". As used here, ethylene α-olefin plastomers include terpolymers of ethylene and higher α-olefin comonomers. According to U.S. Pat. No. 4,469,753, Tafmers are copolymers of butene-1.

Although it appears that the Tafmer-type plastomers are prepared using the Ziegler-Natta heterogeneous catalyst systems, other ethylene α-olefin plastomers are manufactured using homogeneous metallocene single-site catalyst systems as previously described.

The following is a general discussion of LLDPE, VLDPE and plastomer properties from several perspectives.

Crystallinity

Differential Scanning Colorimetry ("DSC") is commonly used to measure the amount of crystallinity in a plastic sample, while revealing the nature of this crystallinity. As determined in a procedure similar to ASTM D-3418, a DSC is performed by exposing a sample of the plastic to a constant rate of heating, i.e., 50° C. per minute in a E.I. DuPont de Neumours Company ("DuPont") brand differential scanning colorimeter. When the temperature of a sample reaches the melting point of a crystalline region, the continued application of heat causes the crystalline fraction to melt, while the sample temperature remains constant. After the crystalline region has melted, the sample temperature once again begins to rise.

DSC measurements were performed on two types of VLDPE's: the Union Carbide Corporations ("Union Carbide") 1137, an ethylene-butene copolymer with 0.906 g/cm$^3$ density and the Dow Attane™ 4001, an ethylene-octene copolymer with 0.912 g/cm$^3$ density. The same type measurement was performed with Tafmer A-1085. Each of these ethylene α-olefin copolymers has some crystallinity but the crystalline nature of the ethylene α-olefin plastomer and the VLDPE copolymers is entirely different.

The entire crystalline phase of the ethylene α-olefin Tafmer A-1085 plastomer melts between about 55° and 85° C., and this melting point range is consistent with the crystalline phase being made up of an ordered butene-ethylene copolymer. In contrast, the VLDPE copolymers useful in this invention have at least one crystalline phase with the dominant phase being that of a higher temperature melting point, above about 90° C.

The melting points of representative VLDPE, LLDPE and plastomeric ethylene α-olefin copolymers useful in the practice of this invention are seen in Table A. t,0170

Table A demonstrates the substantial difference in melting points of VLDPE and LLDPE as compared to ethylene α-olefin copolymer plastomers. More particularly, ethylene α-olefin copolymer plastomers suitable for use in this invention have melting points below about 90° C. and VLDPE and LLDPE materials suitable for use in this invention have melting points above about 90° C. Preferably the plastomers have melting points below about 85° C. Preferred VLDPE copolymers for practice in this invention have a crystalline melting point between about 92° C. and about 125° C.

Vicat Softening Point

Vicat softening points as performed by ASTM 1525 are reported by the resin manufacturers and are summarized in Table B (Vicat Softening Points). t,0180

Based on the foregoing and for purposes of this invention, LLDPE and VLDPE-type ethylene α-olefin copolymers useful in the practice of this invention preferably have Vicat softening points of at least about 75° C., and most preferably between about 78° C. and about 100° C. Conversely, preferred plastomer-type ethylene α-olefin copolymers have Vicat softening points below about 72° C. and most preferably between about 50° C. and about 72° C.

Molecular Weight/Size Distribution

Ethylene α-olefin copolymers may be partially characterized by their weight average molecular weight (Mw) which is determined by multiplying the weight of each chain of a given number of repeat units by the number of such chains and dividing by the total weight of chains. Ethylene α-olefin copolymers may also be partially characterized by a number average molecular weight (Mn), which is derived from the total weight of polymer molecules divided by the total number of molecules. When both of these are known, they can be used to characterize the shape of the molecular weight distribution curve for the copolymer, i.e., the number of polymer chains in a molecular weight interval as the ordinate and the molecular weight as the abscissa.

A high Mw/Mn connotes a wide distribution of molecular weights whereas a low Mw/Mn connotes a narrow distribution. Mw/Mn can be measured by several different techniques, but the gel permeation chromatography ("GPC") procedure outlined in ASTM D-3593-80 is used.

All of the specific LLDPE copolymers known to applicants as suitable for use in this invention have relatively narrow molecular weight distribution and Mw/Mn values above about 3. However, it may be possible to manufacture suitable LLDPE materials having relatively narrow molecular weight distributions and Mw/Mn values below about 3. Mw/Mn values for various polyolefins are given in Table C. t,0200

Tensile Properties

In general, known VLDPE and LLDPE materials useful in the practice of this invention have higher tensile modulus than comparable ethylene α-olefin plastomers. That is, if the two types of copolymers were prepared from the same comonomer and using the same catalyst system, the VLDPE or LLDPE would have higher crystallinity and density, hence higher tensile modulus.

Mitsui, a manufacturer of both plastomers and VLDPE, reports the following values for Young's Modulus, which is the ratio of stress to strain below the proportional limit of a material, as summarized in Table D. t,0210

Another difference in the tensile properties of ethylene α-olefin plastomers, LLDPE and VLDPE materials is that plastomers do not have a definitive yield point whereas VLDPE and LLDPE materials generally do. As defined in ASTM D-638, yield point is the first point on the stress-strain curve at which an increase in strain occurs without an increase in stress.

In the "Future-Pak '91" publication by Mitsui, the following information is reported on page 314 for yield strengths: Tafmer A-4090, no value reported; VLDPE, 0.896 g/cm$^3$ density, is 42 kg/cm$^2$; and VLDPE, 0.907 g/cm$^3$ density, is 84 kg/cm$^2$. This indicates that plastomers do not have a yield point but instead break when sufficient stress is applied. In contrast, VLDPE materials have definite yield points.

The Mitsui results were qualitatively confirmed in a series of tests in which samples of various resins were prepared according to the procedure for thin plastic sheeting outlined in ASTM 882-90. The dimensions of these resin samples tested were 1" wide, 4" long and 7–9 millimeters thick. These samples were tested for yield point and tensile strength following Method A, using a 20"/min. constant rate of separation of the grips initially holding the ends of the specimen 2" apart.

Five samples of each material were tested and the results averaged. The results of these tests are summarized in Table E (Yield Strength). t,0220

Dow and Exxon report the following tensile strengths at break for their ethylene α-olefins, as shown in Table F: t,0230

Suitable LLDPE materials for practicing this invention include those manufactured and sold by Dow under the name Dowlex™ (trademark of Dow Chemical Company, USA) and by Exxon under the name Escorne® (registered trademark of Exxon Chemical Company, USA). Suitable VLDPE materials for practicing this invention include certain ethylene α-olefin polymers manufactured and sold by each of Dow under the names Attane™ and Affinity™ (trademarks of Dow Chemical Company, USA), by Exxon under the name Exact™ (trademark of the Exxon Chemical Company, USA) and by Union Carbide.

Representative VLDPE resins include the ethylene-octene copolymers Dow 4001, 4003, PL 1840, PL 1845 and PL 1880 VLDPEs, the ethylene-butene copolymers Union Carbide 1137, Exxon 3027 and 3025 and the ethylene-butene hexene terpolymers Union Carbide 1192 and Exxon 3033. Representative LLDPEs include the ethylene-octene copolymer Dow 2045 and the ethylene-hexene copolymer Exxon 3001 and 3201.

Suitable ethylene α-olefin plastomer copolymers include certain of those manufactured and sold by each of Exxon under the name Exact™, Mitsui Petrochemical Industries, Ltd. under the name Tafmer, and Dow under the name Affinity™. For example, suitable resins include Mitsui A-4085, A-4090, A-1085 and A-0585 and Exxon 4011.

Summarizing the foregoing, LLDPE provides the needed machinability properties in the outer layers. If there is less than about 25 wt. % LLDPE, the irradiated film does not have adequate slip to be processed through the film wrapping, folding and heat sealing steps when employed as an overwrap for an open food-containing tray. On the other hand, if the LLDPE exceeds about 75 wt. %, the film loses its needed amount of biaxial shrink and desired low permanent deformation characteristics. The LLDPE density should not exceed about 0.925 g/cm$^3$ as the material would be too crystalline and a stable bubble could not be maintained during the biorientation step. The LLDPE melt index should be below about 3.5 g/10 minutes. Higher values result in a blend which is too fluid to form and maintain a stable bubble. The VLDPE in the outer layer is also needed for good machinability, ie., slip properties. Plastomer materials do not provide this characteristic. At least 25 wt. % VLDPE in the outer layer is also needed to provide adequate shrink. 100% LLDPE (ethylene α-olefin of at least about 0.917 g/cm$^3$ density) does not provide adequate shrink.

In the core layer, the first VLDPE should comprise at least about 40 wt. % of the layer as lower concentrations cause bubble instability during biorientation and a low shrink force in the final package. On the other hand, the first VLDPE content in the core layer should not exceed about 75 wt. % because the film would be too stiff for complete heat sealing. That is, the film would not be sufficiently flexible for end folding and compression for good interlayer contact in the end flaps for heat sealing. The core layer first VLDPE density should be at least about 0.905 g/cm$^3$ to improve burn through resistance and maintain good bubble stability.

Turning now to the second (and lower density) VLDPE in the core layer, it should comprise at least about 10 wt. % of the layer, with the plastomer being at least 15%, to retain the stretch recovery and broad range heat seal characteristics. If the ratio of plastomer to second VLDPE is outside of about 0.77 to about 1.83, the stretch recovery would not be optimized. The second VLDPE density should be at least about 0.900 g/cm$^3$ to provide optimum stretch recovery heat sealing characteristics.

It should be noted in this respect that the second and lower density VLDPE bridges the gap between the plastomer constituent and the first and higher density VLDPE. Inclusion of this second VLDPE constituent improves stretch recovery and it appears to function as a plasticizer for the other constituents by lowering the blends overall crystallinity and increasing its amorphous content. Higher than about 0.905 g/cm$^3$ density for this second VLDPE constituent undesirably reduces the film's stretch recovery.

The biaxially oriented heat-shrinkable film of this invention may be produced by known techniques such as by coextruding at least the core layer and the first and second outer layers on each side of the core layer to form a primary tube as, for example, described in Canadian Patent 982,923. Alternatively, the composite primary tube may be formed by coating lamination, wherein a first outer tubular layer is extruded and thereafter the core and second outer tubular layers are sequentially coated onto the outer surfaces of the first tubular layer and the core layer. As another alternative, the first outer and core outer layers may themselves be coextruded, and the second outer layer thereafter coated onto the outside surface of the core layer. Coating lamination procedures are described in U.S. Pat. No. 3,741,253. As still another alternative, the at least three layer film may be formed as a sheet by the well-known slot casting procedure.

If the at least three layer film has been prepared as a primary tube or converted from a primary sheet into a tube, it may be biaxially oriented by the well-known two step "double bubble" or trapped process. One such process is described in U.S. Pat. No. 3,456,044. This involves reheating the primary tube and simultaneously stretching the tube in the machine direction ("MD") by operating longitudinally spaced nip rolls at different speeds, and stretching the tube in the transverse direction ("TD") by inflating air inside the tube. Suitable stretch ratios are from about 2 to about 6 with MD/TD ratios of about 3 to about 5 preferred.

In the practice of this invention, it is essential to crosslink one or more layers of the film. This may be accomplished by, for example, irradiation using high energy electrons, ultraviolet radiation, x-rays, beta particles and the like. The irradiation source can be any electron beam generator operating in a range of about 150 kilovolts to about 6 megavolts with a power output capable of supplying the desired dosage. The voltage can be adjusted to appropriate levels. If used as the sole crosslinking method, the irradiation is preferably carried out at dosage between about 5 MR and about 10 MR, and most preferably between about 7.5 MR and about 8.5 MR.

In order to reduce the amount of radiation needed for crosslinking, crosslinking enhancers that are well-known in the art can be used. They are added to the blend prior to being formed into a film and include, among others, ethylene glycol dimethacrylate, triallyl cyanurate, divinylbenzene and trimethylol propane triacrylate. Additional suitable materials will be apparent to those skilled in the art.

Crosslinking may also be accomplished chemically through utilization of peroxides, as is well known to those of skill in the art.

Processwise, irradiation can be applied to the entire film or to a single substrate layer such as the first outer layer and prior to biaxial orientation if the primary multilayer film is prepared by coating lamination. This type of irradiative crosslinking is for example described in U.S. Pat. No. 3,741,253. Alternatively, if the film is simultaneously coextruded, it may be preferable to irradiate the entire multilayer film after biaxial orientation as, for example, described in U.S. Pat. No. 4,714,638.

A general discussion of crosslinking can be found at pages 331 to 414 of volume 4 of the Encyclopedia of Polymer Science and Technology, Plastics, Resins, Rubbers, Films published by John Wiley & Sons, Inc.

Unless otherwise noted, the resins utilized in the present invention are generally commercially available in pellet form and may be melt blended or mechanically mixed by well known methods using commercially available equipment including tumblers, mixers or blenders. Also, if desired, well known additives such as processing aids, slip agents, antiblocking agents, pigments, etc., and mixtures thereof may be incorporated into the film by blending prior to extrusion.

The resins and any additives are introduced to an extruder (generally one extruder per layer) where the resins are melt plastified by heating and then transferred to an extrusion or coextrusion die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. In extrusion of the VLDPE and LLDPE blend for the first and second layers as well as the first and second VLDPE and plastomer blend in the core layer, barrel and die temperatures, for example, may range between about 325° F. and about 450° F. However, depending upon such factors as other resins which may be employed, the manufacturing process used and particular equipment and other process parameters utilized, variations are expected. Actual process parameters including process temperatures will be set by one skilled in the art without undue experimentation.

EXAMPLE 1

Preparing the Films

The three layer films were prepared by the trapped or double bubble method as described above. In particular, all three layers were simultaneously coextruded, cooled and then reheated for biaxial orientation.

Various percentages of first VLDPE (Attane™ XU 61520.01), second VLDPE (Exact™ 3027), plastomer (Tafmer A 4085) and LLDPE (Escorene® LL 3201) were blended to form first and second outer layers on opposite sides of the core layer. These were either two component or three component blends. Likewise, various percentages of first VLDPE (Union Carbide type 1192), second VLDPE (Exact™ 3027), LLDPE (Escorene® LL 3201) and plastomer (Tafmer A 4085) were blended so as to form the core layer of various three layer films. These blends were either two or three components. All formulations are given in Table I.

With respect to additive packages, the preferred outer layer package used was 3 wt. % of an antifog and cling additive, Atmer® 8112, manufactured by Imperial Chemical Industries Ltd. and comprising 20% antifog agent in LLDPE of 40 melt index, 3 wt. % of a first slip component, Ampacet 10069, manufactured by Ampacet Corporation and comprising glycerol monostearate concentrate in polyethylene, 1 wt. % of a second slip component, Ampacer 10090, a erucamide concentrate in polyethylene and 1 wt. % of a fluoroelastomer processing aid.

The preferred additive package for the core layer comprised 2% by weight of a fluoroelastomer processing aid concentrate.

In each instance, the dry resin outer layer components were blended by tumble mixing and then fed to a single type extruder and a 60 mm diameter die for coextrusion on either side of the core extruder. Likewise, the dry resin core layer components were blended by tumble mixing and then fed to a single screw extruder and then to a 60 mm diameter die for coextrusion with the outer layers flowing through extrusion passages on either side of the core extruder.

The resins were heat plastified and extruded into a primary tube of about 3.2" diameter having about a 0.010–0.015" wall thickness. The extruder barrel and die temperatures were 350° F. The primary tube was cooled to about 60° F. and then reheated to about 185°–195° F. for biaxial orientation. The machine direction (MD) stretch ratio was about 4.5 to 1 and the transverse direction (TD) stretch ratio was about 4 to 1. Draw point temperature, bubble cooling rates and stretch ratios were adjusted to maximize bubble stability.

The samples were irradiated with a 175 KeV electron beam to a dose of 8 MR.

In all of the sample embodiments of the invention film set forth in the following Examples, with the exception of the prior art W. R. Grace and Company films, the overall thickness of the film samples was about 0.6–0.85 mls, comprising a first outer layer of about 15 to about 25% of the total thickness, a core layer of about 50% to about 70% and a second outer layer of about 15 to about 25%. For the prior art Ralph-type film in the sample embodiments, the overall thickness was about the same as above and in the same ratios.

Except for the control sample, SSD-310, all of the samples below were produced as described above.

Sample SSD-310 is the control film, made by Cryovac, a division of W.R. Grace and Company. It is believed to be a 3 or 5 layer coextruded multilayer film. This is the standard film presently used in the poultry packaging process.

Sample #16 film is a nonirradiated Ralph formulation.

Sample #47/16 film is a nonirradiated Ralph-type formulation with LLDPE in the core.

Sample #47/16A is the same formulation as #47/16, but irradiated.

Sample #27A is the same as #47/16A and has stabilizers added to prevent the degradation of slip additives.

Sample #27K is a film of a formulation similar to #47/16A, with a reduced plastomer/second VLDPE ratio.

Sample #28D is an irradiated film of a formulation similar to this invention, and is irradiated.

Sample #29B is an irradiated film of a formulation of this invention.

Sample #29D is an irradiated film of a formulation of this invention.

EXAMPLE 2

The Tray Slide Test

The Tray Slide test was performed on all samples except #16. This test was performed to simulate the kind of forces produced on the Ossid 500 around the front flap roller.

A rectangular #3P styrofoam poultry tray that contained a one pound weight was wrapped around its longitudinal axis with a sheet of film, over the top of the tray with the edges overlapping on the bottom of the tray. At this point, the tray was enclosed in a film tube with an open side at either end. Next, the part of the film extending over the tray and forming the two ends of the tube were somewhat flattened, forming flaps, and one flap was folded under the tray.

A clamp with a 500 gram weight was attached to the unfolded flap. The tray was then placed on a flat surface with the bottom edge against a ⅜" diameter stainless steel rod with a surface finish of 8 to 16 grind. The weighted flap was draped over the rod, which was clamped in a notch 3/16" by 3/16" at the end of the flattened surface. The tray was then pushed forward from the back with a spring gauge and the peak force required to push the tray forward was recorded.

Tray slide values of greater than 4.0 lbs. result in the tray hanging up at the first flap roller. A sample with a value of less than 3.2 lbs. does not hang up, and samples with values between 3.2 and 4.0 lbs. give variable results. The results are given in Table I.

The test results show the control is in the acceptable range, as are samples #28D, #29B and #29D of the present invention and the Ralph film #47/16 and #27A. The irradiated Ralph-type films, #47/16A and #27K, give variable to unacceptable results. t,0320

EXAMPLE 3

The Film/Film Slip Test

The Film/Film Slip test was performed with all samples except #16, #47/16A and #27K. This test shows that at high values, the package tightness remains after wrapping the package longitudinally, as described in Ex. 2 above, whether or not the longitudinal seam is heat sealed. The film shows that it is tacky enough to stick to itself while the remainder of the packaging is completed.

In this test, film was placed on the sintered metal surface of a metal cart having wheels which were placed along guide rails. The metal cart is 12" long×4.25" wide and is conected to a apparatus which allows a vacuum to be pulled through the inside of the cart. A vacuum was applied and the film was flattened. A pully drive motor was connected to the front of the cart. This motor can pull the cart forward along the guide tracks at approximately 2' per minute.

Another sheet of the same film was wrapped around a brass bar 3" long×1.5" wide×0.375" high. This sheet of film was secured with double sided tape to the bar and kept wrinkle free on the bottom of the bar. A spring gauge with the ability to measure up to 5 pounds of tension was attached to the brass bar.

The pulley drive motor was then turned on, pulling the cart along the guide rails. The peak force was recorded for each of the test samples and used in the calculations of slip ratio as shown in Table I.

EXAMPLE 4

The Film/Metal Rod Slip Test

The Film/Metal Rod Slip test was performed on each of the samples described above except for #16, #47/16A and #27K. The purpose of this test was to produce the denominator of the Slip Ratio. It has also been found that films with high number results show a tendency to bind or jam up on metal rollers.

The materials used in this test were a tray slide fixture having an L-shaped shelf cut into one end and having a metal rod placed on this shelf; a 2"×14" film strip of each of the samples described above; a 1000 gram full scale spring gauge; two binder clamps and a 50 gram weight. Each test was performed as follows:

One clamp was attached to each end of the film strip. The spring gauge was zeroed and attached to one arm of one of the clamps and the 50 gram weight was attached to an arm of the clamp on the opposite end of the film strip. The spring gauge-clamp and a small portion of the film strip were placed on the surface of the tray slide fixture, while the remainder of the film was hung over the metal rod in the end of the tray slide fixture. The spring gauge was then slowly pulled away from the metal rod across the tray slide fixture, drawing the film across the metal rod. The value on the spring gauge while in motion was recorded. Each sample was tested three times with the average number being recorded.

The Slip Ratio was calculated as: t,0340

This ratio is a indication of the tendency of the film to have a flap pull back problem. The results are given in Table I. Preferred film to metal rod slip is 120 grams. Preferred Slip Ratio to prevent flap pull back is greater than 10.

EXAMPLE 5

The Stretch Recovery Test

A Stretch Recovery test was performed on samples SSD-310, #16, #47/16A and #29D described above. The purpose of this test was to determine the amount of time it takes each film, after it has been used for overwrapping and has been stretched and shrunk, to recover its shape after being indented. This is an important feature of a commercially usable film in the retail food market.

Two sheets 12" in the machine direction by 7.75" in the transverse direction were cut from each film. Each sheet was used to wrap a flat plastic rectangular board $3/16$" thick with dimensions similar to the 3P trays, having a tube approximately 2" long and about 1.5" in diameter fitted into the center of the board and extending approximately 1" above the top surface of the board, where the diameter of the tube was parallel with the board surface, laying the sheet on the top side of the board first and folding the sheet down over its length, and using tape to attach the edges of the sheet to the bottom of the board. Next, the corners of the sheet were folded into the bottom of the board, and finally the flaps on either end of the board were folded in. The flaps were also taped to the bottom. The maximum gap between the pieces of tape was 0.5".

The sheets were shrunk around these test boards in a Belco model ST 2108 hot air shrink tunnel at a temperature of 180° F. and a belt speed set at a setting of 3.5. The samples were allowed to cool approximately 15 minutes and 70 hours after shrinking. Then the trays were placed in a stretch recovery tester.

The stretch recovery tester contains a spring loaded plunger with an $11/16$" diameter carriage bolt head attached to it. The plunger stops are set such that the carriage bolt head stops when the plunger is fully depressed with the upper side of the bolt head 0.5" below the original film surface that covers the tube centered in the tray.

The plunger was depressed on the stretch recovery tester until it bottomed out, thereby pressing the bolt head into the sheet overwrapping the food tray, and then the plunger was released. The time it took for the sheet to return to a flat, wrinkle free surface after the plunger was released was measured. Time was measured in seconds, up to 60 seconds.

The results are given in Table I. The 15 minute aged control material recovered in 5 seconds and the Ralph-films, #16 and #47/16A recovered in approximately 1 second. The 15 minute aged #29D, a formulation of the present invention that included a processing aid, recovered in 1–3 seconds. The 70 minute aged control film took 12 seconds to recover while #29D recovered in 3 seconds. These results demonstrate that the film of the present invention performed better than the control film in both the 15 minute and 70 hour test.

EXAMPLE 6

Hot Bar and Platen Sealing Tests

A series of experiments were performed where nonirradiated Ralph-type film, samples #16 and #47/16, irradiated Ralph-type sample #47/16A, and film sample #29D of the present invention, irradiated and nonirradiated, were tested to determine their acceptable heat sealing ranges in both hot bar and platen systems.

a) platen Sealing Test.

Each of the film samples were tested as follows:

A rectangular 3P polystyrene foam tray, approximately 8.5" Long×6.5" Wide×1.25" Deep was wrapped with a cut sheet of sample film approximately 18"×15.5" as described in Ex. 2, except that both flap ends were folded under the tray. A 5 mm×10"×10" sheet of Mylar™ polyethylene terephthalate film (trademark of E.I. DuPont de Nemours & Company, USA) was placed on the bottom extending up the sides of the tray. It was taped in place with one piece of tape on two opposite ends of the Mylar™ film.

The platen was preheated to the desired temperature. The bottom of the wrapped tray was placed in contact with the platen while having a 6 lb. compression weight on the top of the tray. The tray was left on the platen anywhere from 2 to 8 seconds. At the end of this time, the tray was removed from the platen, placed on the laboratory countertop and rotated rapidly for 10–20 seconds to cool the seal. Next, cool tap water was run on the Mylar™ film. The Mylar™ film was then removed and the seal inspected. The results of each sample tested are given in Tables I and J.

b) Hot Bar Sealing Test.

The hot bar sealing test determines the acceptable temperature ranges for heat sealing plastic films using a thermal bar hear sealer. The same samples tested in the Platen Sealing Test were tested here. The tests were performed as follows:

A Sencorp systems Model 24-AS laboratory sealer manufactured by Sencorp Systems, Inc., Hyannis, Mass., USA, was used. The thermal bar heat sealer is equipped with an upper ¼" wide sealing bar that may be heated to variably controlled temperatures. In this test, two 1" wide×4" long (TD direction) samples were cut from the sample films. The sealer was equipped with controls for temperature, time and seal bar pressure. The controls were set at 1.0 seconds dwell time, the time that the upper heated jaw is held against the lower ⅜" thick×1" wide silicone pad, and at 50 psi jaw pressure.

Two film samples were held together and placed between the upper jaw and lower sealing platen of the sealer. The upper jaw and lower pad have glass fiber reinforced release covers to prevent film from sticking to the sealing surfaces. By trial and error, the minimum temperature to seal the two film portions to each other was determined by pressing the jaw against the pad at the prescribed pressure and time with various temperature settings.

The maximum temperature was then determined for a similar film sample by placing the adjoining film portions between the covered sealer jaw and pad and closing the upper seal bar down on the lower pad. The film sample was observed after trial and error applications of higher temperatures and the temperature that did not cause a break in the seal, burn through or significant distortion of the seal was determined. The maximum temperature is the last noted temperature obtained before observing a break in the seal integrity.

The results are given in Table J below. t,0380

As can be seen from Table J, the effective heat sealing ranges for the Ralph-type film samples #16, #47/16 and #47/16A are quite wide for the hot bar type sealing systems, ie., at least 50° F. However, they are substantially narrower in a platen-type system, ie., no more than 35° F.

Table J also shows that for a nonirradiated film having outer layers and core formulations according to this invention, sample #29D nonirradiated, the effective heat sealing ranges for both the hot bar and platen systems were very narrow and impractical, ie., 10° F., for the platen heat sealing systems.

From this background and from prior experience in films, one skilled in the art might expect that irradiation of these inventive films would have some beneficial effect in terms of widening the extremely narrow heat sealing range of films having the present formulations for the outer layers and core layer and that the sealing ranges of the Ralph-type formulation films would be much broader after irradiation. Surprisingly, after irradiating the present formulation multilayer film sample #29D with 8 MR, the hot bar and platen heat sealing ranges were widened to a much broader extent than expected.

The hot bar seal range for sample #29D irradiated was widened from 260°–270° F. to 310°–500+° F. or a 1800+% increase in sealing range, as compared to the 360% and 200+% increases seen in the Ralph-type films. Likewise, platen seal range for sample #29D irradiated was widened from 250°–260° F. to 280°–400+° F., a 1100+% increase in sealing range. Although an increase in the Ralph-type film #16 is reported, it is also seen that sporadic burn through occurred, making the film unusable in commercial applications, whereas the other Ralph-type film, #47/16, showed a 240+% increase in the platen sealing range. In both instances, the film of the present invention showed much larger increases in sealing ranges than did the other films.

EXAMPLE 7

Ossid 500 Wrapping Tests

A series of wrapping tests were performed using the Ossid™ 500 wrapping-platen sealing-platen cooling system.

The standard sized 3P rectangular styrofoam trays as described above were filled with a one pound bag of rice to simulate poultry cuts. The nine sample films used were the same as described in Example 1.

The Ossid™ 500 system was operated at a wrapping rate of about 28 trays per minute. The platen was set at a temperature of about 340°–350° F., the tray heat contact time was about 2–4 seconds, and the tray belt speed was about 50 ft/min. Between about 25 and 50 food packages were wrapped with each film sample.

The rice filled trays were placed on the Ossid™ 500, which automatically overwrapped the trays with film as described above. The trays overwrapped with the nine film samples were then automatically platen heat sealed by the Ossid™ 500. Each of the packages were inspected for machinability, or the suitability of the film to be used on this machine, flap pull back problems and the quality of the heat seals produced on the machine. The results are qualitatively summarized in Table I, which shows that samples of the present invention, #28D and #29D performed as well as the control, SSD-310, while the Ralph-type films, both irradiated and nonirradiated, had various problems with heat sealing, flap pull back and flap hang up on the rollers.

EXAMPLE 8

Machinability Tests

In this series of food-containing tray wrapping tests, the Ossid™ 500 wrapping and heating-platen cooling system was used to wrap the same type tray used in Example 7, containing one pound bags of rice. Three types of films were used: SSD-310 control and two sample films of the present invention, #29D as described in Ex. 1 and with different amount of additives as noted on Table K. The operating conditions were approximately the same as used in Example 7, but the total number of trays packaged with each type film is reported in Table K. All wrapped trays were examined for various types of tray seal defects, and the results are presented as percent defects of the total number of wrapped trays.

The results are reported in Table K. These results show that the films of the present invention are equivalent to the SSD-310 control film in terms of machinability and sealability.

For purposes of this Example 8, the various types of defects are described as follows:

a) burn through: any hole or penetration of the film which results from melting/shrinking of the film during sealing which can result in package leakage.

b) incomplete seal: any package which does not completely seal due to lack of bonding between film layers, forming a potential leaker.

c) flap pull back: the occurrence of at least one of the end flaps being pulled out from the bottom of the tray during or following the flap folding operation and prior to entering the sealer/cooler. t,0410

In summary, the test results from Examples 1–8 show that: a) sample #16 gave a narrow sealing range in the Platen Test; b) sample #47/16 had a broader sealing range than did

16, but not yet broad enough for commercial use; c) sample #47/16A had a very broad sealing range but it jams at the front flap folder on the Ossid™ 500, which jamming correlates with the Tray Slide test value of greater than 4.0 lbs; d) sample #27A, a #47/16-type film, had a moderate level of front flap pull back that was predicted by a decreased Slip Ratio, making it unsuitable for use on the Ossid™ 500, even though it had no front flap fold jamming problems; e) sample #27K had higher Tray Slide values and a high level of flap pull back on the Ossid™ 500; f) sample #28D had incomplete sealing on the Ossid™ 500; g) sample #29B had a low Slip Ratio and a moderate level of front flap pull back was observed, and h) sample #29D showed all the preferred laboratory test properties and performed well on the Ossid™ 500 in all respects.

Further modifications of the invention will be apparent to those skilled in the art, modifications which will be within the scope of the invention as defined in the following claims.

What is claimed is:

1. A crosslinked biaxially oriented heat shrinkable multilayer stretch film comprising at least a first outer layer, a second outer layer and a core layer between said first and second outer layers, said first and second outer layers each comprising a two component polyethylene blend of between about 25 and about 75 wt. % VLDPE of density between about 0.900 and about 0.914 g/cm$^3$, and between about 25 and about 75 wt. % LLDPE of melt index below about 3.5 g/10 minutes and density between about 0.917 and about 0.925 g/cm$^3$, said LLDPE comprising less than about 35 wt. % of the total film weight; and said core layer comprising a three component blend of between about 40 and about 75 wt. % first VLDPE of density between about 0.905 and about 0.914 g/cm$^3$, between about 10 and about 35 wt. % second VLDPE of density between about 0.900 and about 0.905 g/cm$^3$, and between about 15 and about 35 wt. % ethylene α-olefin plastomer copolymer of density below about 0.900 g/cm$^3$, said film being heat shrinkable and being crosslinked such that when subjected to the Platen Test on a plate heated to a contact surface temperature range between about 280° F. and about 400° F. for a contact time of between about 2 and about 4 seconds, the film heat seals and does not burn through.

2. A film according to claim 1, wherein in the first and second outer layers the VLDPE comprises from about 30 to about 40 wt. % and the LLDPE comprises from about 60 to about 70 wt. %.

3. A film according to claim 1, wherein in the core layer the first VLDPE comprises from about 60 to about 75 wt. %, the second VLDPE comprises about 13 to about 20 wt. % and the plastomer comprises about 15 to about 25 wt. %.

4. A film according to claim 3, wherein the ratio of plastomer to second VLDPE is about 0.77 to about 1.83.

5. A film according to claim 3, wherein the ratio of plastomer to second VLDPE is about 1.29 to about 1.42.

6. A film according to claim 2, wherein in the core layer the first VLDPE comprises from about 60 to about 75 wt. %, the second VLDPE comprises about 13 to about 20 wt. % and the plastomer comprises about 15 to about 25 wt. %.

7. A film according to claim 6, wherein the ratio of plastomer to second VLDPE is about 0.77 to about 1.83.

8. A film according to claim 6, wherein the ratio of plastomer to second VLDPE is about 1.29 to about 1.42.

9. In a hermetically sealed and evacuated food package comprising a tray with a bottom section surrounded by upwardly extending side and end walls, perishable food supported on the upper surface of the tray bottom section, and a stretched heat shrunk film extending over each of the food, the side and end wall upper edges and at least part of the lower surface of the tray bottom section and heat sealed to itself in flattened relationship against said lower surface; the improvement comprising as said film a crosslinked biaxially oriented heat shrinkable multilayer stretch film comprising at least a first outer layer, a second outer layer and a core layer between said first and second outer layers, said first and second outer layers each comprising a two component polyethylene blend of between about 25 and about 75 wt. % VLDPE of density between about 0.900 and about 0.914 g/cm$^3$, and between about 25 and about 75 wt. % LLDPE of melt index below about 3.5 g/10 minutes and density between about 0.917 and about 0.925 g/cm$^3$, said LLDPE comprising less than about 35 wt. % of the total film weight; and said core layer comprising a three component blend of between about 40 and about 75 wt. % first VLDPE of density between about 0.905 and about 0.914 g/cm$^3$, between about 10 and about 35 wt. % second VLDPE of density between about 0.900 and about 0.905 g/cm$^3$, and between about 15 and about 35 wt. % ethylene α-olefin plastomer copolymer of density below about 0.900 g/cm$^3$, said film having original biaxial heat shrink properties and being crosslinked such that when subjected to the Platen Test on a plate heated to a contact surface temperature range between about 280° F. and about 400° F. for a contact time of between about 2 and about 4 seconds, the film heat seals and does not burn through.

10. A food package according to claim 9, wherein in the first and second outer layers the VLDPE comprises from about 30 to about 40 wt. % and the LLDPE comprises from about 60 to about 70 wt. %.

11. A food package according to claim 9, wherein in the core layer the first VLDPE comprises from about 60 to about 75 wt. %, the second VLDPE comprises about 13 to about 20 wt. % and the plastomer comprises about 15 to about 25 wt. %.

12. A food package according to claim 11, wherein the ratio of plastomer to second VLDPE is about 0.77 to about 1.83.

13. A food package according to claim 11, wherein the ratio of plastomer to second VLDPE is about 1.29 to about 1.42.

14. A food package according to claim 10, wherein in the core layer the first VLDPE comprises from about 60 to about 75 wt. %, the second VLDPE comprises about 13 to about 20 wt. % and the plastomer comprises about 15 to about 25 wt. %.

15. A food package according to claim 14, wherein the ratio of plastomer to second VLDPE is about 0.77 to about 1.83.

16. A food package according to claim 14, wherein the ratio of plastomer to second VLDPE is about 1.29 to about 1.42.

17. In the process for platen heat sealing the overlying folded ends of multiple contiguous layers of a stretched thermoplastic film covering a food-containing tray having side and end walls upwardly extending from a bottom section wherein the multiple layers of film are folded over the tray end walls, pressed against the lower surface of the tray bottom section and interlayer heat bonded together to form a hermetically sealed and evacuated food package, the improvement comprising: a crosslinked biaxially oriented heat shrinkable multilayer stretch film comprising at least a first outer layer, a second outer layer and a core layer between said first and second outer layers, said first and second outer layers each comprising a two component polyethylene blend of between about 25 and about 75 wt. %

VLDPE of density between about 0.900 and about 0.914 g/cm$^3$, and between about 25 and about 75 wt. % LLDPE of melt index below about 3.5 g/10 minutes and density between about 0.917 and about 0.925 g/cm$^3$, said LLDPE comprising less than about 35 wt. % of the total film weight; and said core layer comprising a three component blend of between about 40 and about 75 wt. % first VLDPE of density between about 0.905 and about 0,914 g/cm$^3$, between about 10 and about 35 wt. % second VLDPE of density between about 0.900 and about 0.905 g/cm$^3$, and between about 15 and about 35 wt. % ethylene α-olefin plastomer copolymer of density below about 0.900 g/cm$^3$, said film being heat shrinkable and being crosslinked such that when subjected to the Platen Test on a plate heated to a contact surface temperature range between about 280° F. and about 400° F. for a contact time of between about 2 and about 4 seconds, the film heat seals and does not burn through; providing a flat metal plate as the platen surface; heating the upper surface of said plate to temperature between about 300 ° and about 400° F.; contacting downwardly and inwardly pressed folded end portions of the stretched film cover with the heated metal plate for a period of between about 2 and about 4 seconds so as to bond the contiguous film layers of said folded end portions without burn through of said film; and thereafter immediately cooling heat bonded end portions of said film to a temperature below about 200° F.

18. The process according to claim 17, wherein in the first and second outer layers the VLDPE comprises from about 30 to about 40 wt. % and the LLDPE comprises from about 60 to about 70 wt. %.

19. The process according to claim 17, wherein in the core layer the first VLDPE comprises from about 60 to about 75 wt. %, the second VLDPE comprises about 13 to about 20 wt. % and the plastomer comprises about 15 to about 25 wt. %.

20. The process according to claim 19, wherein the ratio of plastomer to second VLDPE is about 0.77 to about 1.83.

21. The process according to claim 19, wherein the ratio of plastomer to second VLDPE is about 1.29 to about 1.42.

22. The process according to claim 18, wherein in the core layer the first VLDPE comprises from about 60 to about 75 wt. %, the second VLDPE comprises about 13 to about 20 wt. % and the plastomer comprises about 15 to about 25 wt. %.

23. The process according to claim 22, wherein the ratio of plastomer to second VLDPE is about 0.77 to about 1.83.

24. The process according to claim 22, wherein the ratio of plastomer to second VLDPE is about 1.29 to about 1.42.

* * * * *

UNITED STATES PATENT AND TRADEMARK OFFICE
CERTIFICATE OF CORRECTION

PATENT NO. : 5,460,861
DATED : October 24, 1995
INVENTOR(S) : Stephen James Vicik, et al.

It is certified that error appears in the above-identified patent and that said Letters Patent is hereby corrected as shown below:

Please delete Columns 1-22 and substitute Columns 1-26 as per attached.

Signed and Sealed this

Fourteenth Day of January, 1997

Attest:

BRUCE LEHMAN

Attesting Officer     Commissioner of Patents and Trademarks

MULTILAYER STRETCH/SHRINK FILM

FIELD OF THE INVENTION

This invention relates to an improved biaxially oriented heat shrinkable multilayer film, a hermetically sealed and evacuated trayed food package wherein the film is used as a stretched heat shrunk overwrap and a method for sealing and wrapping such packages.

BACKGROUND OF THE INVENTION

For many years, food products such as fresh poultry were shipped in bulk from the food processors to supermarkets where the bulk pieces were divided into small quantities and repackaged for retailing. For example, fresh poultry was cut up, placed on cardboard or plastic trays, and covered with stretch film secured to the tray by tack welding.

For improved efficiency the current trend is to perform the retail packaging operation in the food processing plant and ship the small retail packages from such plants to the retailers. There is also a trend towards evacuating and hermetically sealing the food retail packages in the central food processing plants, due to the longer storage time between retail packaging and consumer use. Such packaging increases the shelf life of the food packages. Also, there is a need for increased abuse resistant food retail packages because of the more frequent handling, impact and abrasion inherent in the above-described food processing plant retail packaging system.

This retail packaging can be accomplished in a variety of ways. A number of systems are available to food processors for wrapping and heat sealing poultry-containing trays with plastic overwrap film. One packaging system that uses a continuous belt sealer is the Ossid™ 500, produced by the Ossid Corporation. (Ossid™ is a trademark of the Ossid Corporation, North Carolina, USA.) Generally, a poultry-containing tray is moved by a series of conveyors and rolls while a film is fed from a dispenser and mechanically pulled over the tray top. The film edges are wrapped around the tray, pressed against the tray bottom, overlapped and sealed against it. Finally, the tray is moved forward and the opposite ends cut. In the Ossid™ 500 system both cut portions of the film, the flaps, are pulled under the tray and shaped under the tray.

Sealing is done with heat and pressure. In impulse sealing systems, the contact temperature ranges from about 400° to 800° F. with a high applied pressure due to the narrow sealing surface. In a bar heating sealing system, the temperature ranges from 250° to 400° F. with a similar pressure as above. The heat contact time is longer than with the impulse system. The Ossid 500 employs a continuous belt sealer that consists of a release belt that is drawn over a heated platen. The resultant platen seal has characteristics that vary significantly from other commercial sealing processes. In the platen heating-sealing system, the temperature is at about 250° to 400° F., using a low pressure of about 0.1 to 2.0 psi, with the heat contact time being 2 to 4 seconds.

The wrapped tray is passed to the belt or platen which applies heat that bonds the film layers together and, upon cooling, the seal is fixed. The heat bonded film is then immediately cooled to a temperature below about 200° F.

The machinability of the film, or the way that it operates on the machine, is an important characteristic of the film used.

The most commonly used film in the trayed food overwrap market is polyvinyl chloride (PVC). This thermoplastic polymer has been used because of satisfactory elongation and elastic memory. But in some instances the package becomes leaky during shipment and thereby unacceptable to the customer. This is because the PVC material in overwrapped trays is tack welded to itself and not hermetically sealed. This problem cannot be solved by hermetically sealing because of a very narrow sealing temperature range between which the seal is effective at the low temperature end and "burn through" or melting of the PVC at the high temperature end. This range is so limited as to be impractical with many commercially employed heat sealing systems.

Another limitation of PVC tray overwrap material is its poor resistance to physical abuse. The PVC material tends to tear along the edges of the overwrapped tray if rubbed during transit by another tray or an enclosing carton.

One characteristic of PVC is that although it contracts, it is not generally "heat-shrinkable", i.e., it is a material that tends not to return to its original unstretched (unextended) dimension when heated to its softening point. The terms "orientation" or "oriented" are used to describe the manufacture of heat-shrinkable films, wherein resin material is heated to its flow or melting point and extruded through a die into either tubular or sheet form. After cooling, the relatively thick extrudate is reheated to a temperature range suitable to orient or align the crystallites and/or molecules of the material. The orientation temperature range for a given material or materials is understood by those skilled in the art to be in a range which revises the intermolecular configuration of the material by physical alignment of the crystallites and/or molecules of the material to improve certain mechanical properties of the film such as shrink tension as, for example, measured in accordance with ASTM D-2838-81. When the stretching force is applied in one direction, uniaxial orientation results. When the stretching force is simultaneously applied in two directions, biaxial orientation results.

In view of the limitations of PVC as a stretch film food tray overwrap material, there have been prior efforts to identify a heat-shrinkable thermoplastic film having an improved combination of elongation, elastic memory, heat sealability and puncture resistance. However, most heat-shrinkable thermoplastic film packaging materials suitable for food contact have relatively poor elasticity or elastic memory. Thus, when a food wrapped in such a material shrinks from moisture loss, the film does not shrink, resulting in a loose package that is unacceptable.

One PVC replacement film for use as a trayed food overwrap material is described in U.S. Pat. Nos. 5,272,016 and 5,279,872, issued to D. J. Ralph ("Ralph"), incorporated herein by reference to the extent pertinent. The Ralph film is the biaxially oriented heat-shrinkable multilayer stretch type, comprising at least a first outer layer, a second outer layer, and a core layer between the first and second outer layers. The outer layers each comprise a blend of between about 20 and about 35 wt. % ("wt. %") ethylene α-olefin plastomer copolymer of density below about 0.90 g/cm$^3$, and between about 65 and about 80 wt. % very low density polyethylene ("VLDPE"). The core layer comprises ethylene α-olefin copolymer having a higher melting point than the melting point(s) of either of the first or second outer layers. By way of example, the core layer may be polypropylene or a polyolefin. Embodiments of the latter include VLDPE, linear low density polyethylene ("LLDPE"), and blends of two different density VLDPE's or VLDPE and LLDPE.

The Ralph-type film in nonirradiated form has been demonstrated to be suitable as a PVC replacement for food tray overwrapping and sealing by the impulse and bar heating-sealing systems. However, it has substantial limitations when used in platen sealing systems.

When the heat seal between the film layers forming the end flaps is not complete, the package is defective. Incomplete seals represent potential air/fluid leaks and loss of food quality and/or desired appearance in the retail market. As seen from the above, the number of overlapping film layers to be sealed together may vary substantially, generally from six to at least twenty. This means that the required maximum seal temperature must be relatively high, because as the number of film layers increases, the temperature at a given residence time required for a complete seal increases. However, "burn through" places an upper limit on the sealing temperature. Burn through means the temperature at which any hole or penetration of the film occurs, resulting from melting and/or shrinking of the film during sealing.

When the Ralph-type film with a 100% VLDPE core layer was tested for use on platen sealed poultry-containing trays, the sealing range was too narrow as complete sealing could not be obtained without burn through. In an attempt to overcome this problem, LLDPE was added to the core layer making the core a VLDPE-LLDPE blend. This formulation provided a broad enough platen seal range on an Ossid 500 system under ideal conditions, but under production conditions the sealing range was still too narrow. To broaden the heat sealing range of the VLDPE-LLDPE blend core layer Ralph-type film, the film was irradiated at a dose of 8 MR after biaxial orientation.

Although irradiation of the VLDPE-LLDPE blend core layer Ralph-type film provided the needed wide heat sealing range, a new and unexpected problem developed. The film had poor machinability. The slide characteristics of the film were such that the film could not be smoothly transported through and over the various belts and rollers which are essential to film movement through the wrapping machine. At the same time, it should be recognized that the film cannot be so frictionless that it cannot be secured by the clamps as, for example, chain grips, which grab the film edges and pull it taut over the top of the tray.

During testing, another facet of the machinability problem with the irradiated Ralph-type film, flap pull back, was discovered. Flap pull back refers to the tendency for the folded under flap to be pulled away from the tray bottom surface by movement across the rollers prior to entering the platen sealer-cooler. This problem appears to be related to the frictional properties of the film, possibly the ratio of the friction between the flap folding rollers on the platen sealing-cooling system and the film-to-film slip.

An improved polyolefin-type heat-shrinkable oriented stretch film suitable for use as a platen heat sealed overwrap material for a food tray with a wide sealing range and good machinability is needed. This film should also be characterized by good elongation, good elastic memory, puncture resistance and abrasion resistance.

An improved method for wrapping and platen-sealing a polyolefin stretch-shrink film as an overwrap on a food-containing tray is also needed.

Also needed is an improved evacuated hermetically sealed food-containing tray overwrapped by a heat shrunk polyolefin film.

BRIEF DESCRIPTION OF THE INVENTION

An improved polyolefin-type heat shrinkable oriented stretch film suitable for use as a overwrap material for a food tray that is platen heat sealed on an automated system has been invented. This film is characterized by good elongation, good elastic memory, puncture resistance and abrasion resistance. It also has a wide sealing range and good machinability, especially in the platen-type heat sealing system.

One aspect of this invention relates to a crosslinked biaxially oriented heat shrinkable multilayer stretch film comprising at least one outer layer, a second outer layer and a core layer between the first and second outer layers. The outer layers each comprise a two component polyethylene blend of between about 25 and about 75 wt. % VLDPE of density between about 0.900 and about 0.914 g/cm$^3$, and between about 25 and about 75 wt. % LLDPE of melt index below about 3.5 g/10 minutes and density between about 0.917 and about 0.925 g/cm$^3$. The LLDPE comprises less than about 35 wt. % of the total film weight.

The core layer of this film comprises a three component blend of between about 40 and about 75 wt. % first VLDPE having a density between about 0.905 and about 0.914 g/cm$^3$, between about 10 and about 35 wt. % second VLDPE of density between about 0.900 and about 0.905 g/cm$^3$, and between about 15 and about 35 wt. % ethylene α-olefin plastomer copolymer with a density below about 0.900 g/cm$^3$. In this film, the core layer has a lower composite melting point than do the outer layers.

The film of this invention has biaxial heat shrink properties and is crosslinked such that when subjected to the Platen Test (described below) on a plate heated to a contact surface temperature range between about 280° F. and about 400° F., for a contact time of between about 2 and about 4 seconds, the film heat seals and does not burn through. Heat shrinkable means that the film has at least 10% free shrink at 90° C. measured in both the machine and transverse directions in accordance with ASTM D-2732.

Another aspect of the invention relates to a hermetically sealed and evacuated food package comprising a tray with a bottom section surrounded by upwardly extending side and end walls, perishable food supported on the upper surface of the bottom section, and a stretched heat shrunk film extended over the food, the upper edges of the side walls and at least part of the lower surface of the tray bottom section and heat sealed to itself in flattened relationship against the lower surface so as to form with the tray a hermetically sealed enclosure for the food. In this aspect of the invention, the improvement is the biaxially oriented multilayer composition as the stretched heat shrunk film described in the paragraphs above.

Still another aspect of this invention relates to a process for platen heat sealing the overlying folded ends of multiple contiguous layers of a stretched thermoplastic film covering a food-containing tray having side and end walls upwardly extending from a bottom section wherein the multiple layers of film are folded over the tray end walls, pressed against the lower surface of the tray bottom section and interlayer heat bonded together to form a hermetically sealed and evacuated food package. The improvement comprises using as the thermoplastic film the above described at least three layer film article, providing a flat metal plate with a release surface as the platen surface, heating the upper surface of said plate to temperature between about 250° and 400° F., contacting pressed folded end portions of the stretched film cover with the heated metal plate for a period of between about 2 and about 4 seconds so as to bond the contiguous film layers of said folded end portions together without burn through of said film, and thereafter immediately cooling the beam bonded end portions of said film to temperature below about 200° F.

BRIEF DESCRIPTION OF THE DRAWINGS

FIG. 1 is a cross-sectional view of the flap folding mechanism.

FIG. 2 is a cross-sectional elevation view of a sealer-cooler system.

DETAILED DESCRIPTION OF THE INVENTION

In the food industry and, in particular in the poultry industry, small quantities of poultry are cut up and packaged in trays which are overwrapped with film. This packaging allows retail sized quantities of food to be prepackaged by the food plant and shipped to retail outlets in a condition acceptable to both the health department authorities, the retailer and the final consumer.

The various film-shaping steps in a representative method for covering a food-containing open tray with a stretch-shrink film using the hot platen sealing system is described below. Each of the following steps is performed automatically on an overwrap system, in particular, the Ossid™ 500, starting with a tray of food or, particularly, poultry.

Food containing open trays are longitudinally spaced and moved forward on a feed conveyor belt. The feed belt is supported at opposite ends by rolls and moves continuously to carry trays to a position beneath a film roll dispersing system positioned above the conveyor belt. When a sensor detects the presence of the food containing tray beneath the feed roll system, film is then dispensed from the supply roll through a series of guide and tensioning rolls as will be understood by those skilled in the art. The dispensed and tensioned film is seized and stretched by a series of clamps as, for example, chain grips longitudinally aligned on opposite sides of the dispensed film edges at progressively increasing distances from the longitudinal centerline of the system in the direction of the film movement. Downwardly moving clamps grab the films outer edges and progressively pull the film tautly over the top edges of tray sides. There are two points in the chain gripping system where problems can occur with the wrong type of film: the film can be either too slippery for the clamps to correctly grasp it, or not slippery enough so that the film does not dispense easily and therefore jams up in the dispensing system.

The clamps are activated by cams at each end of chain grip belt to grab and release the tensioned film at respective opposite ends of the belt. Upon release from the grip clamps, the film is pulled under the tray by plates and center rollers. The two edges of the film are overlapped and can be longitudinally sealed together by heated rollers. The tubular film-enclosed tray is driven forward by belt conveyor having flexible, eg., elastomeric contact surfaces including side walls. The transverse distance of these side walls from the longitudinal centerline can be adjusted depending on the tray size and film thickness.

After the tube film longitudinal center seal is completed, the opposite ends are cut by knives. Next, the cut portion of the tube film extending in front of the tray (ie., the front flap) is pulled under the tray by a roller-vacuum system. Flap guides are located on each side of the tray to help shape the front flap so that it does not extend beyond the bottom edges of the tray. At this point in the film packaging system, the front end film has been stretched over and under the tray front end against the tray bottom and towards the tray rear end. The flap folding areas of the machine are also areas where film with incorrect frictional properties will jam up the overwrap process.

As shown in FIG. 1, the partially film 5 enclosed food-containing tray 1 then passes over the rear films flap folding conveyor 2 which, for example, may comprise a series of plastic rollers 3 with a leading metal roller 4. The latter is longitudinally spaced from the next forward roller to provide a gap. The trailing flap 6 is pulled with this gap by a mechanically applied vacuum system. The rollers 3, which are moving faster than the tray 1, flatten the trailing flap 6 under the tray 1 to form the food package.

As the rear flap is being folded under, the front flap can be pulled out. If frictional forces are higher between the film and the metal roller of the flap folding area than between the film and itself, the front flap is pulled out. If the front flap is not completely sealed, the whole package must be reworked.

The stretch wrapped food package is now moved to the sealer system.

As seen in FIG. 2, the bottom surfaces of foam pillows 12 in the sealer system are in direct contact with the wrapped food package 1 to apply uniform pressure to insure efficient heat transfer by solid conduction from the heated metal platen 13 to the film end folds pressed against the bottom outer surface of the tray 1. Heat is applied by a heating means, eg., electric resistance or circulating fluid. A representative temperature range for the heated platen top surface in the practice of this invention is 300°–400° F. Based on a belt sealer conveyor 14 speed of about 50 ft/minute and a 40" long heating platen 13, the tray-platen contact time is about 2–4 seconds.

After heat sealing the flap ends to themselves as supported by the food package bottom surface, the food package is conveyed to a cooling platen 15 that is cooled. The top surface of the platen may be cooled to about 55°–65° F. and is in contact with the tray 1 for a sufficient amount of time to cool the heated film below 200° F.

If the film used to overwrap the food trays has the wrong machinability qualities, the trays will not be usable. The film must be slippery enough to slide though the overwrap machine without jamming, but must be able to be held tautly in place when being stretched over the food and maintain this tautness until sealed. It must allow the trays to continue their forward movement on the conveyor belt once the flaps have been folded under. And finally, it must be able to be completely heat sealed without burning through the layers of film.

The polyolefin multilayer film of this invention requires at least three layers, two outer layers and a core layer between the outer layers, has biaxial heat shrink properties and is crosslinked. Stretch recovery and abrasion resistance of the film meets the requirements of the food packaging industry. It exhibits good machinability, overcomes the problems associated with an irradiated Ralph film, has adequate slip properties, is resistant to burn through and has no flap pull back.

The film of this invention is a crosslinked biaxially oriented heat shrinkable multilayer stretch film comprising at least one outer layer, a second outer layer and a core layer between the first and second outer layers. The outer layers each comprise a two component polyethylene blend of between about 25 and about 75 wt. % VLDPE of density between about 0.900 and about 0.914 g/cm$^3$, and between about 25 and about 75 wt. % LLDPE of melt index below about 3.5 g/10 minutes and density between about 0.917 and about 0.925 g/cm$^3$. The LLDPE comprises less than about 35 wt. % of the total film weight. A preferable range of components is from about 30 to about 40 wt. % of VLDPE and from about 60 to about 70 wt. % of LLDPE. Additives can comprise up to approximately 10% of the final formulation.

The core layer of this film comprises a three component blend of between about 40 and about 75 wt. % first VLDPE having a density between about 0.905 and about 0.914 g/cm$^3$, between about 10 and about 35 wt. % second VLDPE of density between about 0.900 and about 0.905 g/cm$^3$, and between about 15 and about 35 wt. % ethylene α-olefin plastomer copolymer with a density below about 0.900 g/cm$^3$. A preferable range of components is from about 60 to about 75 wt. % of the first VLDPE, about 13 to about 20 wt. % of the second VLDPE and about 15 to about 25 wt. % of the plastomer. Also, the ratio of plastomer to second VLDPE should range from about 0.77 to about 1.83, preferably from about 1.29 to about 1.42. Additives can comprise up to about 3% of the final formulation of the blend.

Polyolefins are hydrocarbon polymers derived from a simple olefin, such as polyethylene or polypropylene and copolymers of such olefins. Their basic structure is characterized by the chain $\{CH_2CH_2\}_n$, and they may be found as a homopolymer or as a copolymer. Polyolefins used in the present invention, unless otherwise noted, are substantially free of halogens, oxygen or other elements apart from carbon and hydrogen, except for incidental amounts, e.g., trace residues of catalysts or process related contaminants of the above.

The outer layers are a two component polyethylene blend of VLDPE and LLDPE, while the core layer is a three component blend of two VLDPE's and a so-called ethylene α-olefin "plastomer".

One type of polyethylene is known as Linear Low Density Polyethylene ("LLDPE"). Only copolymers of ethylene with α-olefins are in this group. LLDPEs are presently recognized by those skilled in the art as having densities from about 0.917 to about 0.940 g/cm$^3$. The α-olefin used is usually 1-butene, 1-hexene or 1-octene. Ziegler-type catalysts are usually employed in their production, although Phillips catalysts are also used to produce LLDPE having densities at the higher end of the range. LLDPEs typically do not have many long branches off the main chain.

Another form of linear polyethylene is Very Low Density Polyethylene ("VLDPE"), also called Ultra Low Density Polyethylene ("ULDPE"). The densities of commercial VLDPEs are recognized by those skilled in the art to range between about 0.890 and about 0.914 g/cm$^3$. VLDPEs comprise copolymers of ethylene with α-olefins, usually 1-butene, 1-hexene or 1-octene, and in some instances terpolymers, as, for example, of ethylene, 1-butene and 1-octene. As used here, VLDPE also includes terpolymers of ethylene and higher α-olefin comonomers.

A process for making VLDPE is described in European Patent Document publication number 120,503, hereby incorporated by reference. As described in EP 120,503, these particular VLDPEs are made by using the traditional Ziegler-Natta heterogeneous catalyst system.

Alternatively, VLDPE and LLDPE may be prepared by a homogeneous metallocene single-site catalyst system which in general produces molecular chains of more uniform lengths with more evenly spaced comonomer. This type of system is described in U.S. Pat. No. 5,183,867, assigned to Exxon Chemical Company ("Exxon") and European Patent Application Publication 0 416 815 A2, assigned to Dow Chemical Company ("Dow"), both incorporated by reference to the extent pertinent.

For example, as described in U.S. Pat. Nos. 4,640,856 and 4,863,769, VLDPEs are useful in biaxially oriented films which have superior properties to comparable films using LLDPEs. These superior properties include higher shrink, higher tensile strength and greater puncture resistance.

Commercially available ethylene α-olefin plastomers have densities typically below 0.900 g/cm$^3$. Examples of plastomers include the Japanese Mitsui Corporation's ("Mitsui") "Tafmers". As used here, ethylene α-olefin plastomers include terpolymers of ethylene and higher α-olefin comonomers. According to U.S. Pat. No. 4,469,753, Tafmers are copolymers of butene-1.

Although it appears that the Tafmer-type plastomers are prepared using the Ziegler-Natta heterogeneous catalyst systems, other ethylene α-olefin plastomers are manufactured using homogeneous metallocene single-site catalyst systems as previously described.

The following is a general discussion of LLDPE, VLDPE and plastomer properties from several perspectives.

Crystallinity

Differential Scanning Colorimetry ("DSC") is commonly used to measure the amount of crystallinity in a plastic sample, while revealing the nature of this crystallinity. As determined in a procedure similar to ASTM D-3418, a DSC is performed by exposing a sample of the plastic to a constant rate of heating, i.e., 50° C. per minute in a E.I. DuPont de Neumours Company ("DuPont") brand differential scanning colorimeter. When the temperature of a sample reaches the melting point of a crystalline region, the continued application of heat causes the crystalline fraction to melt, while the sample temperature remains constant. After the crystalline region has melted, the sample temperature once again begins to rise.

DSC measurements were performed on two types of VLDPE's: the Union Carbide Corporations ("Union Carbide") 1137, an ethylene-butene copolymer with 0.906 g/cm$^3$ density and the Dow Attane™ 4001, an ethylene-octene copolymer with 0.912 g/cm$^3$ density. The same type measurement was performed with Tafmer A-1085. Each of these ethylene α-olefin copolymers has some crystallinity but the crystalline nature of the ethylene α-olefin plastomer and the VLDPE copolymers is entirely different.

The entire crystalline phase of the ethylene α-olefin Tafmer A-1085 plastomer melts between about 55° and 85° C., and this melting point range is consistent with the crystalline phase being made up of an ordered butene-ethylene copolymer. In contrast, the VLDPE copolymers useful in this invention have at least one crystalline phase with the dominant phase being that of a higher temperature melting point, above about 90° C.

The melting points of representative VLDPE, LLDPE and plastomeric ethylene α-olefin copolymers useful in the practice of this invention are seen in Table A.

TABLE A

| Type Compound and Manufacturer | MP (°C.) |
|---|---|
| Dow 2045 LLDPE | 121 |
| Exxon 3001 LLDPE | 125[1] |
| Exxon 3201 LLDPE | 126[1] |
| Union Carbide 1137 VLDPE | 117 |

Ethylene α-Olefin Melting Points (°C.)

TABLE A-continued

Ethylene α-Olefin Melting Points (°C.)

| Type Compound and Manufacturer | MP (°C.) |
|---|---|
| Union Carbide 1085 VLDPE | 117 |
| Union Carbide 1092 VLDPE | 121 |
| Union Carbide 1063 VLDPE | 124 |
| Union Carbide 1064 VLDPE | 125 |
| Dow Attane ™ 4001 VLDPE | 121 |
| Dow Attane ™ 4003 VLDPE | 107/124 (two peaks) |
| Exxon Exact ™ 3025 VLDPE | 103[1] |
| Exxon Exact ™ 3034 VLDPE | 95[1] |
| Exxon Exact ™ 3033 VLDPE | 94[1] |
| Exxon Exact ™ 3027 VLDPE | 92[1] |
| Dow Affinity ™ PL 1840 VLDPE | 103 |
| Dow Affinity ™ PL 1880 VLDPE | 100 |
| Mitsui Tafmer A-4085 plastomer | 71 |
| Mitsui Tafmer A-4090 plastomer | 85 |
| Mitsui Tafmer A-1085 plastomer | 71 |
| Exxon Exact ™ 4011 plastomer | 66[1] |

[1] Exxon method

Table A demonstrates the substantial difference in melting points of VLDPE and LLDPE as compared to ethylene α-olefin copolymer plastomers. More particularly, ethylene α-olefin copolymer plastomers suitable for use in this invention have melting points below about 90° C. and VLDPE and LLDPE materials suitable for use in this invention have melting points above about 90° C. Preferably the plastomers have melting points below about 85° C. Preferred VLDPE copolymers for practice in this invention have a crystalline melting point between about 92° C. and about 125° C.

Vicat Softening Point

Vicat softening points as performed by ASTM 1525 are reported by the resin manufacturers and are summarized in Table B (Vicat Softening Points).

TABLE B

Vicat Softening Points (°C.)

| Type Compound and Manufacturer | (°C.) |
|---|---|
| Dow 2045 LLDPE | 100 |
| Union Carbide 1137 VLDPE | 80 |
| Union Carbide 1063 VLDPE | 93 |
| Union Carbide 1064 VLDPE | 90 |
| Union Carbide 1569 VLDPE | 94 |
| Dow Attane ™ 4001 VLDPE | 95 |
| Dow Attane ™ 4003 VLDPE | 80 |
| Dow Attane ™ 4004 VLDPE | 92 |
| Exxon Exact ™ 3033 VLDPE | 75–83 |
| Mitsui Tafmer A-1085 plastomer | 58 |
| Mitsui Tafmer A-4085 plastomer | 54 |
| Mitsui Tafmer A-4090 plastomer | 65 |
| Mitsui Tafmer A-20090 plastomer | 60 |
| Mitsui Tafmer A-0585 plastomer | 62 |
| Exxon Exact ™ 4011 plastomer | 70 |

Based on the foregoing and for purposes of this invention, LLDPE and VLDPE-type ethylene α-olefin copolymers useful in the practice of this invention preferably have Vicat softening points of at least about 75° C., and most preferably between about 78° C. and about 100° C. Conversely, preferred plastomer-type ethylene α-olefin copolymers have Vicat softening points below about 72° C. and most preferably between about 50° C. and about 72° C.

Molecular Weight/Size Distribution

Ethylene α-olefin copolymers may be partially characterized by their weight average molecular weight (Mw) which is determined by multiplying the weight of each chain of a given number of repeat units by the number of such chains and dividing by the total weight of chains. Ethylene α-olefin copolymers may also be partially characterized by a number average molecular weight (Mn), which is derived from the total weight of polymer molecules divided by the total number of molecules. When both of these are known, they can be used to characterize the shape of the molecular weight distribution curve for the copolymer, i.e., the number of polymer chains in a molecular weight interval as the ordinate and the molecular weight as the abscissa.

A high Mw/Mn connotes a wide distribution of molecular weights whereas a low Mw/Mn connotes a narrow distribution. Mw/Mn can be measured by several different techniques, but the gel permeation chromatography ("GPC") procedure outlined in ASTM D-3593-80 is used.

All of the specific LLDPE copolymers known to applicants as suitable for use in this invention have relatively narrow molecular weight distribution and Mw/Mn values above about 3. However, it may be possible to manufacture suitable LLDPE materials having relatively narrow molecular weight distributions and Mw/Mn values below about 3. Mw/Mn values for various polyolefins are given in Table C.

TABLE C

Molecular Weight/Size Distributions

| Type Compound and Manufacturer | Mw/Mn |
|---|---|
| Dow 2045 LLDPE | 4.17 (125,000/30,000) |
| Union Carbide 1137 VLDPE (0.906 g/cm³ density, 1.0 MI) | 4.9 (125,000/25,700) |
| Union Carbide 1192 VLDPE (0.912 g/cm³ density, 0.19 MI) | 12.2 (196,900/16,080) |
| Union Carbide 1096-2 VLDPE (0.912 g/cm³ density, 0.38 MI) | 7.2 (137,000/19,110) |
| Mitsui 0.907 g/cm³ den. VLDPE | 3.2* |
| Exxon Exact ™ 3033 VLDPE | 1.8 (92,000/50,000) |
| Mitsui Tafmer A-4090 plastomer | 2.0* |
| Mitsui Tafmer A-4085 plastomer | 2.35 (108,000/46,000) |
| Mitsui Tafmer A-1085 plastomer | 2.00 (160,000/80,000) |
| Mitsui Tafmer A-0585 plastomer | 2.05 (190,000/92,600) |
| Exxon Exact ™ 4011 plastomer | 2 (approximate) |

*Reported by manufacturer in. "Proceedings of Future-Pak '91", page 314. Procedure for measuring Mw/Mn not identified.

Tensile Properties

In general, known VLDPE and LLDPE materials useful in the practice of this invention have higher tensile modulus than comparable ethylene α-olefin plastomers. That is, if the two types of copolymers were prepared from the same comonomer and using the same catalyst system, the VLDPE or LLDPE would have higher crystallinity and density, hence higher tensile modulus.

Mitsui, a manufacturer of both plastomers and VLDPE, reports the following values for Young's Modulus, which is the ratio of stress to strain below the proportional limit of a material, as summarized in Table D.

TABLE D

| Material | Young's Modulus kg/cm² |
|---|---|
| Tafmer A-4085* | 400 |
| Tafmer A-20090* | 600 |
| VLDPE (0.907 density)** | 1820 |

*"Tafmer", publication of Mitsui Petrochemical Ind. Ltd. page 12
** "Proceedings of Future-Pak '91", page 314

Another difference in the tensile properties of ethylene α-olefin plastomers, LLDPE and VLDPE materials is that plastomers do not have a definitive yield point whereas VLDPE and LLDPE materials generally do. As defined in ASTM D-638, yield point is the first point on the stress-strain curve at which an increase in strain occurs without an increase in stress.

In the "Future-Pak '91" publication by Mitsui, the following information is reported on page 314 for yield strengths: Tafmer A-4090, no value reported; VLDPE, 0.896 g/cm³ density, is 42 kg/cm²; and VLDPE, 0.907 g/cm³ density, is 84 kg/cm². This indicates that plastomers do not have a yield point but instead break when sufficient stress is applied. In contrast, VLDPE materials have definite yield points.

The Mitsui results were qualitatively confirmed in a series of tests in which samples of various resins were prepared according to the procedure for thin plastic sheeting outlined in ASTM 882-90. The dimensions of these resin samples tested were 1" wide, 4" long and 7–9 millimeters thick. These samples were tested for yield point and tensile strength following Method A, using a 20"/min. constant rate of separation of the grips initially holding the ends of the specimen 2" apart.

Five samples of each material were tested and the results averaged. The results of these tests are summarized in Table E (Yield Strength).

TABLE E

| Type Compound and Manufacturer | Yield Strength Average Yield Strength (psi) |
|---|---|
| Dow Attane™ XU61512.21 VLDPE (0.901 den.) | 1020 |
| Dow Attane™ XU61520.01 VLDPE (0.912 den.) | 1329 |
| Union Carbide 1137 VLDPE (0.906 den.) | 1121 |
| Union Carbide 1192 VLDPE (0.912 den.) | 1323 |
| Mitsui Tafmer A-4085 Plastomer (0.88 den.) | No yield point |
| Mitsui Tafmer A-1085 Plastomer (0.88 den.) | No yield point |

Dow and Exxon report the following tensile strengths at break for their ethylene α-olefins, as shown in Table F:

TABLE F

| Affinity and Exact Tensile Strengths | |
|---|---|
| Designation and Type Compound | Value (Mpa) |
| Exxon 3001 LLDPE (D-882) | 48 (MD) |
| | 40 (TD) |
| Exxon 3201 LLDPE (D-882) | 51 (MD) |
| | 40 (TD) |
| Exact™ 4011 plastomer (D-638) | 22 |
| Exact™ 3025 VLDPE (D-882) | 56 (MD) |
| | 39 (TD) |
| Exact™ 3034 VLDPE (D-882) | 71.9 (MD) |
| | 57.1 (TD) |
| Exact™ 3033 VLDPE (D-882) | 68 (MD) |
| | 62 (TD) |
| Exact™ 3027 VLDPE (D-882) | 56 (MD) |
| | 36 TD) |
| Exact™ 3033 VLDPE (D-882) | 90 (MD) |
| | 98 (TD) |
| Affinity™ PL 1840 VLDPE (D-882) | 55 (MD) |
| | 52.7 (TD) |
| Affinity™ PL 1845 VLDPE (D-882) | 45.4 (MD) |
| | 33.4 (TD) |
| Affinity™ PL 1880 VLDPE (D-882) | 49.4 (MD) |
| | 26.2 (TD) |

Suitable LLDPE materials for practicing this invention include those manufactured and sold by Dow under the name Dowlex™ (trademark of Dow Chemical Company, USA) and by Exxon under the name Escorne® (registered trademark of Exxon Chemical Company, USA). Suitable VLDPE materials for practicing this invention include certain ethylene α-olefin polymers manufactured and sold by each of Dow under the names Attane™ and Affinity™ (trademarks of Dow Chemical Company, USA), by Exxon under the name Exact™ (trademark of the Exxon Chemical Company, USA) and by Union Carbide.

Representative VLDPE resins include the ethylene-octene copolymers Dow 4001, 4003, PL 1840, PL 1845 and PL 1880 VLDPEs, the ethylene-butene copolymers Union Carbide 1137, Exxon 3027 and 3025 and the ethylene-butene hexene terpolymers Union Carbide 1192 and Exxon 3033. Representative LLDPEs include the ethylene-octene copolymer Dow 2045 and the ethylene-hexene copolymer Exxon 3001 and 3201.

Suitable ethylene α-olefin plastomer copolymers include certain of those manufactured and sold by each of Exxon under the name Exact™, Mitsui Petrochemical Industries, Ltd. under the name Tafmer, and Dow under the name Affinity™. For example, suitable resins include Mitsui A-4085, A-4090, A-1085 and A-0585 and Exxon 4011.

Summarizing the foregoing, LLDPE provides the needed machinability properties in the outer layers. If there is less than about 25 wt. % LLDPE, the irradiated film does not have adequate slip to be processed through the film wrapping, folding and heat sealing steps when employed as an overwrap for an open food-containing tray. On the other hand, if the LLDPE exceeds about 75 wt. %, the film loses its needed amount of biaxial shrink and desired low permanent deformation characteristics. The LLDPE density should not exceed about 0.925 g/cm³ as the material would be too crystalline and a stable bubble could not be maintained during the biorientation step. The LLDPE melt index should be below about 3.5 g/10 minutes. Higher values result in a blend which is too fluid to form and maintain a stable bubble. The VLDPE in the outer layer is also needed for good machinability, ie., slip properties. Plastomer materials do not provide this characteristic. At least 25 wt. % VLDPE in the outer layer is also needed to provide adequate shrink. 100% LLDPE (ethylene α-olefin of at least about 0.917 g/cm³ density) does not provide adequate shrink.

In the core layer, the first VLDPE should comprise at least about 40 wt. % of the layer as lower concentrations cause bubble instability during biorientation and a low shrink force in the final package. On the other hand, the first VLDPE content in the core layer should not exceed about 75 wt. % because the film would be too stiff for complete heat sealing. That is, the film would not be sufficiently flexible for end folding and compression for good interlayer contact in the end flaps for heat sealing. The core layer first VLDPE density should be at least about 0.905 g/cm$^3$ to improve burn through resistance and maintain good bubble stability.

Turning now to the second (and lower density) VLDPE in the core layer, it should comprise at least about 10 wt. % of the layer, with the plastomer being at least 15%, to retain the stretch recovery and broad range heat seal characteristics. If the ratio of plastomer to second VLDPE is outside of about 0.77 to about 1.83, the stretch recovery would not be optimized. The second VLDPE density should be at least about 0.900 g/cm$^3$ to provide optimum stretch recovery heat sealing characteristics.

It should be noted in this respect that the second and lower density VLDPE bridges the gap between the plastomer constituent and the first and higher density VLDPE. Inclusion of this second VLDPE constituent improves stretch recovery and it appears to function as a plasticizer for the other constituents by lowering the blends overall crystallinity and increasing its amorphous content. Higher than about 0.905 g/cm$^3$ density for this second VLDPE constituent undesirably reduces the film's stretch recovery.

The biaxially oriented heat-shrinkable film of this invention may be produced by known techniques such as by coextruding at least the core layer and the first and second outer layers on each side of the core layer to form a primary tube as, for example, described in Canadian Patent 982,923. Alternatively, the composite primary tube may be formed by coating lamination, wherein a first outer tubular layer is extruded and thereafter the core and second outer tubular layers are sequentially coated onto the outer surfaces of the first tubular layer and the core layer. As another alternative, the first outer and core outer layers may themselves be coextruded, and the second outer layer thereafter coated onto the outside surface of the core layer. Coating lamination procedures are described in U.S. Pat. No. 3,741,253. As still another alternative, the at least three layer film may be formed as a sheet by the well-known slot casting procedure.

If the at least three layer film has been prepared as a primary tube or converted from a primary sheet into a tube, it may be biaxially oriented by the well-known two step "double bubble" or trapped process. One such process is described in U.S. Pat. No. 3,456,044. This involves reheating the primary tube and simultaneously stretching the tube in the machine direction ("MD") by operating longitudinally spaced nip rolls at different speeds, and stretching the tube in the transverse direction ("TD") by inflating air inside the tube. Suitable stretch ratios are from about 2 to about 6 with MD/TD ratios of about 3 to about 5 preferred.

In the practice of this invention, it is essential to crosslink one or more layers of the film. This may be accomplished by, for example, irradiation using high energy electrons, ultraviolet radiation, x-rays, beta particles and the like. The irradiation source can be any electron beam generator operating in a range of about 150 kilovolts to about 6 megavolts with a power output capable of supplying the desired dosage. The voltage can be adjusted to appropriate levels. If used as the sole crosslinking method, the irradiation is preferably carried out at dosage between about 5 MR and about 10 MR, and most preferably between about 7.5 MR and about 8.5 MR.

In order to reduce the amount of radiation needed for crosslinking, crosslinking enhancers that are well-known in the art can be used. They are added to the blend prior to being formed into a film and include, among others, ethylene glycol dimethacrylate, triallyl cyanurate, divinylbenzene and trimethylol propane triacrylate. Additional suitable materials will be apparent to those skilled in the art.

Crosslinking may also be accomplished chemically through utilization of peroxides, as is well known to those of skill in the art.

Processwise, irradiation can be applied to the entire film or to a single substrate layer such as the first outer layer and prior to biaxial orientation if the primary multilayer film is prepared by coating lamination. This type of irradiative crosslinking is for example described in U.S. Pat. No. 3,741,253. Alternatively, if the film is simultaneously coextruded, it may be preferable to irradiate the entire multilayer film after biaxial orientation as, for example, described in U.S. Pat. No. 4,714,638.

A general discussion of crosslinking can be found at pages 331 to 414 of volume 4 of the Encyclopedia of Polymer Science and Technology, Plastics, Resins, Rubbers, Films published by John Wiley & Sons, Inc.

Unless otherwise noted, the resins utilized in the present invention are generally commercially available in pellet form and may be melt blended or mechanically mixed by well known methods using commercially available equipment including tumblers, mixers or blenders. Also, if desired, well known additives such as processing aids, slip agents, antiblocking agents, pigments, etc., and mixtures thereof may be incorporated into the film by blending prior to extrusion.

The resins and any additives are introduced to an extruder (generally one extruder per layer) where the resins are melt plastified by heating and then transferred to an extrusion or coextrusion die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. In extrusion of the VLDPE and LLDPE blend for the first and second layers as well as the first and second VLDPE and plastomer blend in the core layer, barrel and die temperatures, for example, may range between about 325° F. and about 450° F. However, depending upon such factors as other resins which may be employed, the manufacturing process used and particular equipment and other process parameters utilized, variations are expected. Actual process parameters including process temperatures will be set by one skilled in the art without undue experimentation.

EXAMPLE 1

Preparing the Films

The three layer films were prepared by the trapped or double bubble method as described above. In particular, all three layers were simultaneously coextruded, cooled and then reheated for biaxial orientation.

Various percentages of first VLDPE (Attane™ XU 61520.01), second VLDPE (Exact™ 3027), plastomer (Tafmer A 4085) and LLDPE (Escorene® LL 3201) were blended to form first and second outer layers on opposite sides of the core layer. These were either two component or three component blends. Likewise, various percentages of first VLDPE (Union Carbide type 1192), second VLDPE (Exact™ 3027), LLDPE (Escorene® LL 3201) and plastomer (Tafmer A 4085) were blended so as to form the core layer of various three layer films. These blends were either two or three components. All formulations are given in Table I.

With respect to additive packages, the preferred outer layer package used was 3 wt. % of an antifog and cling additive, Atmer® 8112, manufactured by Imperial Chemical Industries Ltd. and comprising 20% antifog agent in LLDPE of 40 melt index, 3 wt. % of a first slip component, Ampacet 10069, manufactured by Ampacet Corporation and comprising glycerol monostearate concentrate in polyethylene, 1 wt. % of a second slip component, Ampacer 10090, a erucamide concentrate in polyethylene and 1 wt. % of a fluoroelastomer processing aid.

The preferred additive package for the core layer comprised 2% by weight of a fluoroelastomer processing aid concentrate.

In each instance, the dry resin outer layer components were blended by tumble mixing and then fed to a single type extruder and a 60 mm diameter die for coextrusion on either side of the core extruder. Likewise, the dry resin core layer components were blended by tumble mixing and then fed to a single screw extruder and then to a 60 mm diameter die for coextrusion with the outer layers flowing through extrusion passages on either side of the core extruder.

The resins were heat plastified and extruded into a primary tube of about 3.2" diameter having about a 0.010–0.015" wall thickness. The extruder barrel and die temperatures were 350° F. The primary tube was cooled to about 60° F. and then reheated to about 185°–195° F. for biaxial orientation. The machine direction (MD) stretch ratio was about 4.5 to 1 and the transverse direction (TD) stretch ratio was about 4 to 1. Draw point temperature, bubble cooling rates and stretch ratios were adjusted to maximize bubble stability.

The samples were irradiated with a 175 KeV electron beam to a dose of 8 MR.

In all of the sample embodiments of the invention film set forth in the following Examples, with the exception of the prior art W. R. Grace and Company films, the overall thickness of the film samples was about 0.6–0.85 mls, comprising a first outer layer of about 15 to about 25% of the total thickness, a core layer of about 50% to about 70% and a second outer layer of about 15 to about 25%. For the prior art Ralph-type film in the sample embodiments, the overall thickness was about the same as above and in the same ratios.

Except for the control sample, SSD-310, all of the samples below were produced as described above.

Sample SSD-310 is the control film, made by Cryovac, a division of W.R. Grace and Company. It is believed to be a 3 or 5 layer coextruded multilayer film. This is the standard film presently used in the poultry packaging process.

Sample #16 film is a nonirradiated Ralph formulation.

Sample #47/16 film is a nonirradiated Ralph-type formulation with LLDPE in the core.

Sample #47/16A is the same formulation as #47/16, but irradiated.

Sample #27A is the same as #47/16A and has stabilizers added to prevent the degradation of slip additives.

Sample #27K is a film of a formulation similar to #47/16A, with a reduced plastomer/second VLDPE ratio.

Sample #28D is an irradiated film of a formulation similar to this invention, and is irradiated.

Sample #29B is an irradiated film of a formulation of this invention.

Sample #29D is an irradiated film of a formulation of this invention.

EXAMPLE 2

The Tray Slide Test

The Tray Slide test was performed on all samples except #16. This test was performed to simulate the kind of forces produced on the Ossid 500 around the front flap roller.

A rectangular #3P styrofoam poultry tray that contained a one pound weight was wrapped around its longitudinal axis with a sheet of film, over the top of the tray with the edges overlapping on the bottom of the tray. At this point, the tray was enclosed in a film tube with an open side at either end. Next, the part of the film extending over the tray and forming the two ends of the tube were somewhat flattened, forming flaps, and one flap was folded under the tray.

A clamp with a 500 gram weight was attached to the unfolded flap. The tray was then placed on a flat surface with the bottom edge against a ⅜" diameter stainless steel rod with a surface finish of 8 to 16 grind. The weighted flap was draped over the rod, which was clamped in a notch 3/16" by 3/16" at the end of the flattened surface. The tray was then pushed forward from the back with a spring gauge and the peak force required to push the tray forward was recorded.

Tray slide values of greater than 4.0 lbs. result in the tray hanging up at the first flap roller. A sample with a value of less than 3.2 lbs. does not hang up, and samples with values between 3.2 and 4.0 lbs. give variable results. The results are given in Table I.

The test results show the control is in the acceptable range, as are samples #28D, #29B and #29D of the present invention and the Ralph film #47/16 and #27A. The irradiated Ralph-type films, #47/16A and #27K, give variable to unacceptable results.

TABLE I

| | | LAB TESTS VERSUS OSSID 500 TRIALS | | | | | | | |
|---|---|---|---|---|---|---|---|---|---|
| FORMULATION | SSD-310 | #16 0 MR | #47/16 0 MR | #47/16A 8 MR | #27A* 8 MR | #27K 8 MR | #28D 8 MR | #29B 8 MR | #29D 8 MR |
| Outer Layers[6] | | | | | | | | | |
| 1st VLDPE (XU-61520.01) | | 43 | 64 | 64 | 63 | 70 | 36 | 30 | 36 |
| Plastomer (Tafmer A-4085) | | 32 | 21 | 21 | 22 | 18 | — | — | — |
| 2nd VLDPE (Exact 3027) | | 25 | 15 | 15 | 15 | 12 | — | — | — |

TABLE I-continued

| | | LAB TESTS VERSUS OSSID 500 TRIALS | | | | | | | |
|---|---|---|---|---|---|---|---|---|---|
| FORMULATION | SSD-310 | #16 0 MR | #47/16 0 MR | #47/16A 8 MR | #27A* 8 MR | #27K 8 MR | #28D 8 MR | #29B 8 MR | #29D 8 MR |
| LLDPE (Exxon 3201) Core[8] | — | — | — | — | — | — | 64 | 70 | 64 |
| 1st VLDPE (U.C. 1192) | — | 100 | 60 | 60 | 60 | 60 | 80 | 70 | 70 |
| Plastomer (Tafmer A-4085) | — | — | — | — | — | — | 12 | 17 | 17 |
| 2nd VLDPE (Exact 3027) | — | — | — | — | — | — | 8 | 13 | 13 |
| LLDPE (Exxon 3201) | — | — | 40 | 40 | 40 | 40 | — | — | — |
| Lab Data | | | | | | | | | |
| Tray slide-peak force (lbs) | 3–3.25 | — | 2.5–3.25 | 3.75–5 | 3.25 | 3.7 | 2.65–3.1 | 2.8 | 3.2 |
| Film/Film slip (lbs) | 1.75–2 | — | 1.75 | — | 1.75–2 | — | 1.5 | 1.0–1.25 | 1.5–2 |
| Film/metal rod slip (grams) | 120 | — | 160–180 | — | 220 | — | 120–130 | 120–130 | 120–130 |
| Slip ratio | 15.6 | — | 10.3 | — | 8.6 | — | 12 | 9.1 | 14.1 |
| Platen seal range | 300–400 | 235–250 | 245–280 | 280–400 | — | — | — | — | 280–400 |
| Stretch recovery | | | | | | | | | |
| 15 min. | 5 sec. | 1 sec. | — | 1 sec. | — | — | — | — | 1–3 sec. |
| 70 hr. | 12 sec. | — | — | — | — | — | — | — | 3 sec. |
| Ossid Data | | | | | | | | | |
| Flap fold hang up | OK | OK | OK | (2) | OK | (1) | OK | OK | OK |
| Flap pull back (%) | 0 | 0 | 0–5 | (3) | 95 | 5–10 | 0 | 30 | 0 |
| Heat seal | OK | (7) | (5) | OK | OK | OK | (4) | OK | OK |

*0.12% Hindered phenol stabilizer added
[1] Very high noise/binding
[2] Some hang-up on the roll for tucking the first flap
[3] Not evaluated due to hang-up
[4] Some incomplete seals
[5] Narrow seal range
[6] Additives compromised 4.5–7.0 wt. % of layer
[7] Sporadic burn through-no reproducible seal range
[8] Additives comprised 3.0–4.0 wt. % of layer

EXAMPLE 3

The Film/Film Slip Test

The Film/Film Slip test was performed with all samples except #16, #47/16A and #27K. This test shows that at high values, the package tightness remains after wrapping the package longitudinally, as described in Ex. 2 above, whether or not the longitudinal seam is heat sealed. The film shows that it is tacky enough to stick to itself while the remainder of the packaging is completed.

In this test, film was placed on the sintered metal surface of a metal cart having wheels which were placed along guide rails. The metal cart is 12" long×4.25" wide and is conected to a apparatus which allows a vacuum to be pulled through the inside of the cart. A vacuum was applied and the film was flattened. A pully drive motor was connected to the front of the cart. This motor can pull the cart forward along the guide tracks at approximately 2' per minute.

Another sheet of the same film was wrapped around a brass bar 3" long×1.5" wide×0.375" high. This sheet of film was secured with double sided tape to the bar and kept wrinkle free on the bottom of the bar. A spring gauge with the ability to measure up to 5 pounds of tension was attached to the brass bar.

The pulley drive motor was then turned on, pulling the cart along the guide rails. The peak force was recorded for each of the test samples and used in the calculations of slip ratio as shown in Table I.

EXAMPLE 4

The Film/Metal Rod Slip Test

The Film/Metal Rod Slip test was performed on each of the samples described above except for #16, #47/16A and #27K. The purpose of this test was to produce the denominator of the Slip Ratio. It has also been found that films with high number results show a tendency to bind or jam up on metal rollers.

The materials used in this test were a tray slide fixture having an L-shaped shelf cut into one end and having a metal rod placed on this shelf; a 2"×14" film strip of each of the samples described above; a 1000 gram full scale spring gauge; two binder clamps and a 50 gram weight. Each test was performed as follows:

One clamp was attached to each end of the film strip. The spring gauge was zeroed and attached to one arm of one of the clamps and the 50 gram weight was attached to an arm of the clamp on the opposite end of the film strip. The spring gauge-clamp and a small portion of the film strip were placed on the surface of the tray slide fixture, while the remainder of the film was hung over the metal rod in the end of the tray slide fixture. The spring gauge was then slowly pulled away from the metal rod across the tray slide fixture, drawing the film across the metal rod. The value on the spring gauge while in motion was recorded. Each sample was tested three times with the average number being recorded.

The Slip Ratio was calculated as:

$$\text{Slip ratio} = \frac{\text{Film/Film Slip (lbs)}}{\text{Film to metal rod slip (gms)}} \times 1000$$

This ratio is a indication of the tendency of the film to have a flap pull back problem. The results are given in Table I. Preferred film to metal rod slip is 120 grams. Preferred Slip Ratio to prevent flap pull back is greater than 10.

EXAMPLE 5

The Stretch Recovery Test

A Stretch Recovery test was performed on samples SSD-310, #16, #47/16A and #29D described above. The purpose of this test was to determine the amount of time it takes each film, after it has been used for overwrapping and has been stretched and shrunk, to recover its shape after being indented. This is an important feature of a commercially usable film in the retail food market.

Two sheets 12" in the machine direction by 7.75" in the transverse direction were cut from each film. Each sheet was used to wrap a flat plastic rectangular board 3/16" thick with dimensions similar to the 3P trays, having a tube approximately 2" long and about 1.5" in diameter fitted into the center of the board and extending approximately 1" above the top surface of the board, where the diameter of the tube was parallel with the board surface, laying the sheet on the top side of the board first and folding the sheet down over its length, and using tape to attach the edges of the sheet to the bottom of the board. Next, the corners of the sheet were folded into the bottom of the board, and finally the flaps on either end of the board were folded in. The flaps were also taped to the bottom. The maximum gap between the pieces of tape was 0.5".

The sheets were shrunk around these test boards in a Belco model ST 2108 hot air shrink tunnel at a temperature of 180° F. and a belt speed set at a setting of 3.5. The samples were allowed to cool approximately 15 minutes and 70 hours after shrinking. Then the trays were placed in a stretch recovery tester.

The stretch recovery tester contains a spring loaded plunger with an 11/16" diameter carriage bolt head attached to it. The plunger stops are set such that the carriage bolt head stops when the plunger is fully depressed with the upper side of the bolt head 0.5" below the original film surface that covers the tube centered in the tray.

The plunger was depressed on the stretch recovery tester until it bottomed out, thereby pressing the bolt head into the sheet overwrapping the food tray, and then the plunger was released. The time it took for the sheet to return to a flat, wrinkle free surface after the plunger was released was measured. Time was measured in seconds, up to 60 seconds.

The results are given in Table I. The 15 minute aged control material recovered in 5 seconds and the Ralph-films, #16 and #47/16A recovered in approximately 1 second. The 15 minute aged #29D, a formulation of the present invention that included a processing aid, recovered in 1–3 seconds. The 70 minute aged control film took 12 seconds to recover while #29D recovered in 3 seconds. These results demonstrate that the film of the present invention performed better than the control film in both the 15 minute and 70 hour test.

EXAMPLE 6

Hot Bar and Platen Sealing Tests

A series of experiments were performed where nonirradiated Ralph-type film, samples #16 and #47/16, irradiated Ralph-type film sample #47/16A, and film sample #29D of the present invention, irradiated and nonirradiated, were tested to determine their acceptable heat sealing ranges in both hot bar and platen systems.

a) Platen Sealing Test.

Each of the film samples were tested as follows:

A rectangular 3P polystyrene foam tray, approximately 8.5" Long×6.5" Wide×1.25" Deep was wrapped with a cut sheet of sample film approximately 18"×15.5" as described in Ex. 2, except that both flap ends were folded under the tray. A 5 mm×10"×10" sheet of Mylar™ polyethylene terephthalate film (trademark of E.I. DuPont de Nemours & Company, USA) was placed on the bottom extending up the sides of the tray. It was taped in place with one piece of tape on two opposite ends of the Mylar™ film.

The platen was preheated to the desired temperature. The bottom of the wrapped tray was placed in contact with the platen while having a 6 lb. compression weight on the top of the tray. The tray was left on the platen anywhere from 2 to 8 seconds. At the end of this time, the tray was removed from the platen, placed on the laboratory countertop and rotated rapidly for 10–20 seconds to cool the seal. Next, cool tap water was run on the Mylar™ film. The Mylar™ film was then removed and the seal inspected. The results of each sample tested are given in Tables I and J.

b) Hot Bar Sealing Test.

The hot bar sealing test determines the acceptable temperature ranges for heat sealing plastic films using a thermal bar hear sealer. The same samples tested in the Platen Sealing Test were tested here. The tests were performed as follows:

A Sencorp systems Model 24-AS laboratory sealer manufactured by Sencorp Systems, Inc., Hyannis, Mass., USA, was used. The thermal bar heat sealer is equipped with an upper ¼" wide sealing bar that may be heated to variably controlled temperatures. In this test, two 1" wide×4" long (TD direction) samples were cut from the sample films. The sealer was equipped with controls for temperature, time and seal bar pressure. The controls were set at 1.0 seconds dwell time, the time that the upper heated jaw is held against the lower ⅜" thick×1" wide silicone pad, and at 50 psi jaw pressure.

Two film samples were held together and placed between the upper jaw and lower sealing platen of the sealer. The upper jaw and lower pad have glass fiber reinforced release covers to prevent film from sticking to the sealing surfaces. By trial and error, the minimum temperature to seal the two film portions to each other was determined by pressing the jaw against the pad at the prescribed pressure and time with various temperature settings.

The maximum temperature was then determined for a similar film sample by placing the adjoining film portions between the covered sealer jaw and pad and closing the upper seal bar down on the lower pad. The film sample was observed after trial and error applications of higher temperatures and the temperature that did not cause a break in the seal, burn through or significant distortion of the seal was determined. The maximum temperature is the last noted temperature obtained before observing a break in the seal integrity.

The results are given in Table J below.

TABLE J

| | Hot Bar and Platen Seal Ranges[1] | | |
|---|---|---|---|
| Sample No. | #16 | #47/16: 47/16A | #29D |
| Hot bar seal range (0 MR) | 230–280 | 220–280 | 260–270 |
| Hot bar seal range (8 MR) | 230–460[2] | 380–500+ | 310–500+ |

TABLE J-continued

| Sample No. | Hot Bar and Platen Seal Ranges[1] | | |
|---|---|---|---|
| | #16 | #47/16; 47/16A | #29D |
| % increase seal range | 360% | 100+% | 1800+% |
| Platen seal range (0 MR) | 235–250[3] | 240–275 | 250–260 |
| Platen seal range (8 MR) | 270–330[3] | 280–400+ | 280–400+ |
| % increase seal range | Burn through unusable | 240+% | 1100+% |

[1] All temperatures are in °F.
[2] 5 MR
[3] Sporadic burn through

As can be seen from Table J, the effective heat sealing ranges for the Ralph-type film samples #16, #47/16 and #47/16A are quite wide for the hot bar type sealing systems, ie., at least 50° F. However, they are substantially narrower in a platen-type system, ie., no more than 35° F.

Table J also shows that for a nonirradiated film having outer layers and core formulations according to this invention, sample #29D nonirradiated, the effective heat sealing ranges for both the hot bar and platen systems were very narrow and impractical, ie., 10° F., for the platen heat sealing systems.

From this background and from prior experience in films, one skilled in the art might expect that irradiation of these inventive films would have some beneficial effect in terms of widening the extremely narrow heat sealing range of films having the present formulations for the outer layers and core layer and that the sealing ranges of the Ralph-type formulation films would be much broader after irradiation. Surprisingly, after irradiating the present formulation multilayer film sample #29D with 8 MR, the hot bar and platen heat sealing ranges were widened to a much broader extent than expected.

The hot bar seal range for sample #29D irradiated was widened from 260°–270° F. to 310°–500+° F. or a 1800+% increase in sealing range, as compared to the 360% and 200+% increases seen in the Ralph-type films. Likewise, platen seal range for sample #29D irradiated was widened from 250°–260° F. to 280°–400+° F., a 1100+% increase in sealing range. Although an increase in the Ralph-type film #16 is reported, it is also seen that sporadic burn through occurred, making the film unusable in commercial applications, whereas the other Ralph-type film, #47/16, showed a 240+% increase in the platen sealing range. In both instances, the film of the present invention showed much larger increases in sealing ranges than did the other films.

EXAMPLE 7

Ossid 500 Wrapping Tests

A series of wrapping tests were performed using the Ossid™ 500 wrapping-platen sealing-platen cooling system.

The standard sized 3P rectangular styrofoam trays as described above were filled with a one pound bag of rice to simulate poultry cuts. The nine sample films used were the same as described in Example 1.

The Ossid™ 500 system was operated at a wrapping rate of about 28 trays per minute. The platen was set at a temperature of about 340°–350° F., the tray heat contact time was about 2–4 seconds, and the tray belt speed was about 50 ft/min. Between about 25 and 50 food packages were wrapped with each film sample.

The rice filled trays were placed on the Ossid™ 500, which automatically overwrapped the trays with film as described above. The trays overwrapped with the nine film samples were then automatically platen heat sealed by the Ossid™ 500. Each of the packages were inspected for machinability, or the suitability of the film to be used on this machine, flap pull back problems and the quality of the heat seals produced on the machine. The results are qualitatively summarized in Table I, which shows that samples of the present invention, #28D and #29D performed as well as the control, SSD-310, while the Ralph-type films, both irradiated and nonirradiated, had various problems with heat sealing, flap pull back and flap hang up on the rollers.

EXAMPLE 8

Machinability Tests

In this series of food-containing tray wrapping tests, the Ossid™ 500 wrapping and heating-platen cooling system was used to wrap the same type tray used in Example 7, containing one pound bags of rice. Three types of films were used: SSD-310 control and two sample films of the present invention, #29D as described in Ex. 1 and with different amount of additives as noted on Table K. The operating conditions were approximately the same as used in Example 7, but the total number of trays packaged with each type film is reported in Table K. All wrapped trays were examined for various types of tray seal defects, and the results are presented as percent defects of the total number of wrapped trays.

The results are reported in Table K. These results show that the films of the present invention are equivalent to the SSD-310 control film in terms of machinability and sealability.

For purposes of this Example 8, the various types of defects are described as follows:

a) burn through: any hole or penetration of the film which results from melting/shrinking of the film during sealing which can result in package leakage.

b) incomplete seal: any package which does not completely seal due to lack of bonding between film layers, forming a potential leaker.

c) flap pull back: the occurrence of at least one of the end flaps being pulled out from the bottom of the tray during or following the flap folding operation and prior to entering the sealer/cooler.

TABLE K

| | Tray Seal Defect Tests [1] | | | |
|---|---|---|---|---|
| Film Sample No. | No. Trays Run | Burn Through | Incomplete Seal | Flap Pull Back |
| SSD-310 | 493 | 0 | 0 | 0.8 |
| #29D[2] | 514 | 0 | 0.2 | 0 |
| #29D[2] | 493 | 0.4 | 0 | 0 |

[1] All results are in percent.
[2] Same composition as sample #29D except the core layer contained the 3.0 wt. % additive package.

In summary, the test results from Examples 1–8 show that: a) sample #16 gave a narrow sealing range in the Platen Test; b) sample #47/16 had a broader sealing range than did

16, but not yet broad enough for commercial use; c) sample #47/16A had a very broad sealing range but it jams at the front flap folder on the Ossid™ 500, which jamming correlates with the Tray Slide test value of greater than 4.0 lbs; d) sample #27A, a #47/16-type film, had a moderate level of front flap pull back that was predicted by a decreased Slip Ratio, making it unsuitable for use on the Ossid™ 500, even though it had no front flap fold jamming problems; e) sample #27K had higher Tray Slide values and a high level of flap pull back on the Ossid™ 500; f) sample #28D had incomplete sealing on the Ossid™ 500; g) sample #29B had a low Slip Ratio and a moderate level of front flap pull back was observed, and h) sample #29D showed all the preferred laboratory test properties and performed well on the Ossid™ 500 in all respects.

Further modifications of the invention will be apparent to those skilled in the art, modifications which will be within the scope of the invention as defined in the following claims.

What is claimed is:

1. A crosslinked biaxially oriented heat shrinkable multilayer stretch film comprising at least a first outer layer, a second outer layer and a core layer between said first and second outer layers, said first and second outer layers each comprising a two component polyethylene blend of between about 25 and about 75 wt. % VLDPE of density between about 0.900 and about 0.914 g/cm³, and between about 25 and about 75 wt. % LLDPE of melt index below about 3.5 g/10 minutes and density between about 0.917 and about 0.925 g/cm³, said LLDPE comprising less than about 35 wt. % of the total film weight; and said core layer comprising a three component blend of between about 40 and about 75 wt. % first VLDPE of density between about 0.905 and about 0.914 g/cm³, between about 10 and about 35 wt. % second VLDPE of density between about 0.900 and about 0.905 g/cm³, and between about 15 and about 35 wt. % ethylene α-olefin plastomer copolymer of density below about 0.900 g/cm³, said film being heat shrinkable and being crosslinked such that when subjected to the Platen Test on a plate heated to a contact surface temperature range between about 280° F. and about 400° F. for a contact time of between about 2 and about 4 seconds, the film heat seals and does not burn through.

2. A film according to claim 1, wherein in the first and second outer layers the VLDPE comprises from about 30 to about 40 wt. % and the LLDPE comprises from about 60 to about 70 wt. %.

3. A film according to claim 1, wherein in the core layer the first VLDPE comprises from about 60 to about 75 wt. %, the second VLDPE comprises about 13 to about 20 wt. % and the plastomer comprises about 15 to about 25 wt. %.

4. A film according to claim 3, wherein the ratio of plastomer to second VLDPE is about 0.77 to about 1.83.

5. A film according to claim 3, wherein the ratio of plastomer to second VLDPE is about 1.29 to about 1.42.

6. A film according to claim 2, wherein in the core layer the first VLDPE comprises from about 60 to about 75 wt. %, the second VLDPE comprises about 13 to about 20 wt. % and the plastomer comprises about 15 to about 25 wt. %.

7. A film according to claim 6, wherein the ratio of plastomer to second VLDPE is about 0.77 to about 1.83.

8. A film according to claim 6, wherein the ratio of plastomer to second VLDPE is about 1.29 to about 1.42.

9. In a hermetically sealed and evacuated food package comprising a tray with a bottom section surrounded by upwardly extending side and end walls, perishable food supported on the upper surface of the tray bottom section, and a stretched heat shrunk film extending over each of the food, the side and end wall upper edges and at least part of the lower surface of the tray bottom section and heat sealed to itself in flattened relationship against said lower surface; the improvement comprising as said film a crosslinked biaxially oriented heat shrinkable multilayer stretch film comprising at least a first outer layer, a second outer layer and a core layer between said first and second outer layers, said first and second outer layers each comprising a two component polyethylene blend of between about 25 and about 75 wt. % VLDPE of density between about 0.900 and about 0.914 g/cm³, and between about 25 and about 75 wt. % LLDPE of melt index below about 3.5 g/10 minutes and density between about 0.917 and about 0.925 g/cm³, said LLDPE comprising less than about 35 wt. % of the total film weight; and said core layer comprising a three component blend of between about 40 and about 75 wt. % first VLDPE of density between about 0.905 and about 0.914 g/cm³, between about 10 and about 35 wt. % second VLDPE of density between about 0.900 and about 0.905 g/cm³, and between about 15 and about 35 wt. % ethylene α-olefin plastomer copolymer of density below about 0.900 g/cm³, said film having original biaxial heat shrink properties and being crosslinked such that when subjected to the Platen Test on a plate heated to a contact surface temperature range between about 280° F. and about 400° F. for a contact time of between about 2 and about 4 seconds, the film heat seals and does not burn through.

10. A food package according to claim 9, wherein in the first and second outer layers the VLDPE comprises from about 30 to about 40 wt. % and the LLDPE comprises from about 60 to about 70 wt. %.

11. A food package according to claim 9, wherein in the core layer the first VLDPE comprises from about 60 to about 75 wt. %, the second VLDPE comprises about 13 to about 20 wt. % and the plastomer comprises about 15 to about 25 wt. %.

12. A food package according to claim 11, wherein the ratio of plastomer to second VLDPE is about 0.77 to about 1.83.

13. A food package according to claim 11, wherein the ratio of plastomer to second VLDPE is about 1.29 to about 1.42.

14. A food package according to claim 10, wherein in the core layer the first VLDPE comprises from about 60 to about 75 wt. %, the second VLDPE comprises about 13 to about 20 wt. % and the plastomer comprises about 15 to about 25 wt. %.

15. A food package according to claim 14, wherein the ratio of plastomer to second VLDPE is about 0.77 to about 1.83.

16. A food package according to claim 14, wherein the ratio of plastomer to second VLDPE is about 1.29 to about 1.42.

17. In the process for platen heat sealing the overlying folded ends of multiple contiguous layers of a stretched thermoplastic film covering a food-containing tray having side and end walls upwardly extending from a bottom section wherein the multiple layers of film are folded over the tray end walls, pressed against the lower surface of the tray bottom section and interlayer heat bonded together to form a hermetically sealed and evacuated food package, the improvement comprising: a crosslinked biaxially oriented heat shrinkable multilayer stretch film comprising at least a first outer layer, a second outer layer and a core layer between said first and second outer layers, said first and second outer layers each comprising a two component polyethylene blend of between about 25 and about 75 wt. %

VLDPE of density between about 0.900 and about 0.914 g/cm$^3$, and between about 25 and about 75 wt. % LLDPE of melt index below about 3.5 g/10 minutes and density between about 0.917 and about 0.925 g/cm$^3$, said LLDPE comprising less than about 35 wt. % of the total film weight; and said core layer comprising a three component blend of between about 40 and about 75 wt. % first VLDPE of density between about 0.905 and about 0.914 g/cm$^3$, between about 10 and about 35 wt. % second VLDPE of density between about 0.900 and about 0.905 g/cm$^3$, and between about 15 and about 35 wt. % ethylene α-olefin plastomer copolymer of density below about 0.900 g/cm$^3$, said film being heat shrinkable and being crosslinked such that when subjected to the Platen Test on a plate heated to a contact surface temperature range between about 280° F. and about 400° F. for a contact time of between about 2 and about 4 seconds, the film heat seals and does not burn through; providing a flat metal plate as the platen surface; heating the upper surface of said plate to temperature between about 300 ° and about 400° F.; contacting downwardly and inwardly pressed folded end portions of the stretched film cover with the heated metal plate for a period of between about 2 and about 4 seconds so as to bond the contiguous film layers of said folded end portions without burn through of said film; and thereafter immediately cooling heat bonded end portions of said film to a temperature below about 200° F.

18. The process according to claim 17, wherein in the first and second outer layers the VLDPE comprises from about 30 to about 40 wt. % and the LLDPE comprises from about 60 to about 70 wt. %.

19. The process according to claim 17, wherein in the core layer the first VLDPE comprises from about 60 to about 75 wt. %, the second VLDPE comprises about 13 to about 20 wt. % and the plastomer comprises about 15 to about 25 wt. %.

20. The process according to claim 19, wherein the ratio of plastomer to second VLDPE is about 0.77 to about 1.83.

21. The process according to claim 19, wherein the ratio of plastomer to second VLDPE is about 1.29 to about 1.42.

22. The process according to claim 18, wherein in the core layer the first VLDPE comprises from about 60 to about 75 wt. %, the second VLDPE comprises about 13 to about 20 wt. % and the plastomer comprises about 15 to about 25 wt. %.

23. The process according to claim 22, wherein the ratio of plastomer to second VLDPE is about 0.77 to about 1.83.

24. The process according to claim 22, wherein the ratio of plastomer to second VLDPE is about 1.29 to about 1.42.

* * * * *